Feb. 18, 1969 W. J. FLITTIE 3,427,790

ENSILAGING MEANS AND METHOD

Filed Oct. 31, 1966 Sheet 1 of 4

INVENTOR.
William J. Flittie
BY H. K. Goldwire
AGENT

INVENTOR
William J. Flittie
BY H. L. Goldwire
AGENT

Feb. 18, 1969 W. J. FLITTIE 3,427,790

ENSILAGING MEANS AND METHOD

Filed Oct. 31, 1966 Sheet 3 of 4

INVENTOR.
William J. Flittie
BY H K Goldwire
AGENT

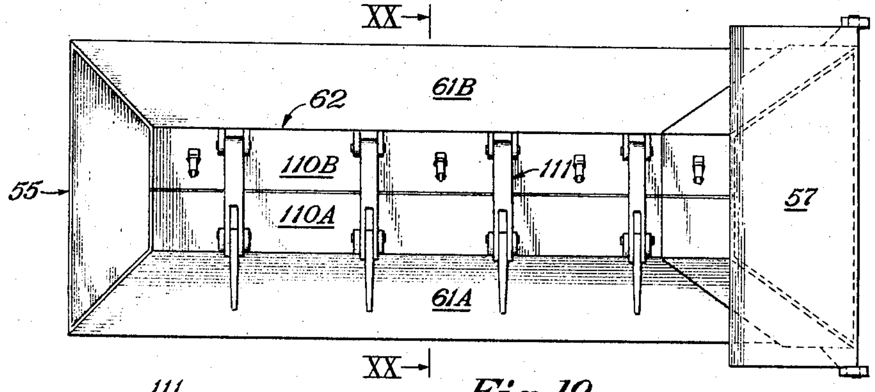
Fig.19
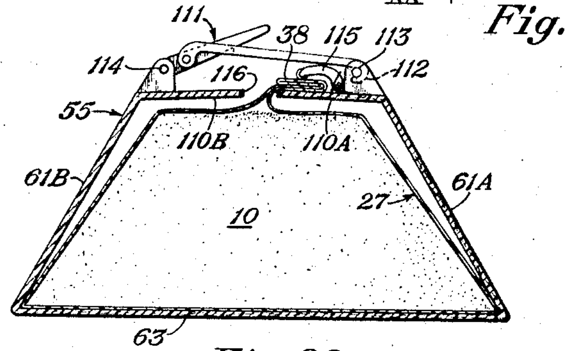
Fig.20
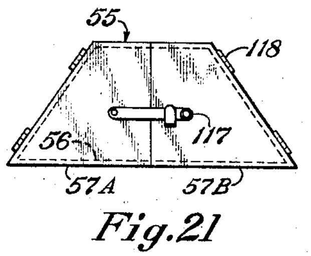
Fig.21
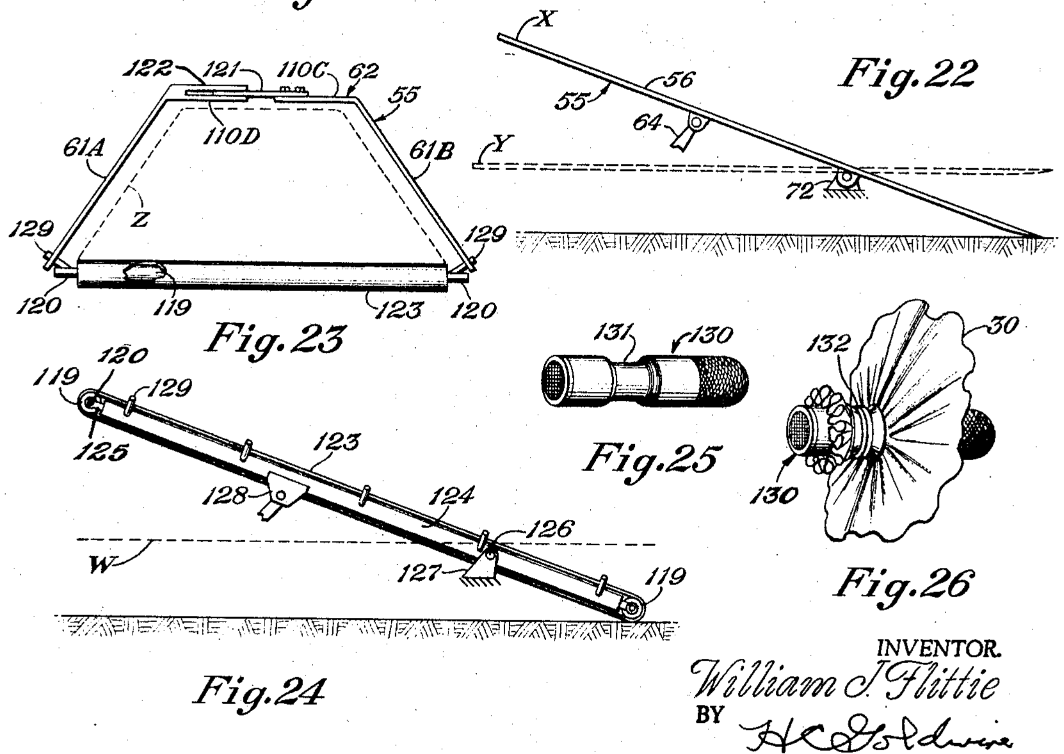
Fig.22, Fig.23, Fig.25, Fig.26
Fig.24
INVENTOR.
William J. Flittie
BY H. C. Goldwire
AGENT United States Patent Office 3,427,790
Patented Feb. 18, 1969

3,427,790

ENSILAGING MEANS AND METHOD

William J. Flittie, Dallas, Tex., assignor to Henry C. Goldwire, Irving, Tex.

Filed Oct. 31, 1966, Ser. No. 590,866
U.S. Cl. 56—1 24 Claims
Int. Cl. A01d *35/22;* A01g *19/06*

ABSTRACT OF THE DISCLOSURE

A method of harvesting and ensilaging feed stuff plant material in which an ensilaging container receives plant material directly from a machine that moves over ground bearing the material, which material the machine chops and expels. The container is deposited on the ground, where fermentation of the plant material occurs. Disclosed apparatuses for ensilaging feedstuff plant portions and implementation of the above operations permit the utilization of a capsule or container of lightweight, readily expendible materials or a capsule of largely preshaped construction and made of heavier, re-useable materials.

This invention relates to agricultural methods and apparatus, and more particularly to a method of ensilaging feedstuff plant material and to improved apparatus for use in ensilaging.

It has long been recognized that the most efficient use that can be made of certain important feedstuff plants is to ensilage appropriate portions of them and to convert the resulting silage into meat by using it for fattening meat animals such as cattle, sheep, hogs, and the like. Silage is also of excellent value for the feeding of dairy cattle and the wintering and other maintenance feeding of livestock. Much less use is made of silage than is desirable, however, because of factors including the very considerable initial investment and the labor and expense incurred in making and using it; and the disappearance of cheap labor and the increasing costs of silos and related equipment make ensilaging impracticable for most farms. Notwithstanding that, to minimize investment, it has been preferred to house a large amount of feed in a single, large silo rather than in a much more expensive plurality of smaller ones, the initial investment per animal to be fed is high.

In using a silo, all the standing crop to be ensilaged must be cut by a man operating a drawn or self-propelled machine which chops the feed and ordinarily expels it from a duct or spout from which it is received by an open wagon or similar conveyance. When filled, one or more other men and tractors are required to pull the conveyance or conveyances to the silo, where an expensive conveyor or blower and related machinery convey the chopped feed into the top of the silo. Emptied conveyances then must be pulled back to the field and substituted for the conveyance currently being drawn with and filled by the chopper, upon its filling becoming complete. This operation is repeated until the crop is all in the silo, and it is expedited insofar as is possible; for exposure of the silage to the sun, air, and air-borne bacteria while in the wagon, its subsequent handling by the loading conveyor, and further standing while exposed to air in the open silo are deleterious to its food value because of the accompanying drying and contamination with undesirable microorganisms. Consequently, ensiling does not start until the feedstuff plants throughout the field are at a best, overall stage for making a particular kind of silage, and all the crop is as quickly as possible placed in the silo and sealed from air either by some upper sealing means pressed down on the feed within the silo or by a slimy, rotted layer that soon forms in the top portion of the chopped feed and seals off the remaining feed from the air. It thus has not been practicable to cut the plants at varying degrees of depth or maturity and thereby produce a number of separate silages of varying feeding characteristics; nor could the harvesting be done in more leisurely fashion and over a longer time by a single man.

Besides the chopper and its motive and/or power supply operating to sever the growing plants in the field, therefore, significantly costly items needed in ensilaging are the wagons, etc. for receiving the feed and conveying it to the field, one or more tractors or the like for pulling the wagons, and the expensive silo and the elevator and other machinery for filling and packing it. In addition, the cost of labor for operating all this equipment is excessive, as is depreciation of the equipment.

After the plant material in the silo has been converted by fermentation into silage, it must be made accessible to the animals to be fed. Much labor and equipment are required for removing the silage from the silo, after first removing and discarding the wasted, spoiled top layer; and the newly exposed silage also spoils unless continuously thereafter removed at a substantial, daily rate. The heavy, removed silage, of course, must be carried by expensive machinery or by much hand labor to the livestock to which it is to be fed, and this dictates the use of feed troughs or the like in a feeding location as close as possible to the silo. Consequently, a feed lot is employed which best is immediately adjacent the silo and which ordinarily contains, at one time, all the animals being fattened or otherwise fed. The trampling and elimination products of many animals are thus concentrated, throughout the long period over which all the silo contents are being removed and fed, in an area which thereby is rendered unfit for any other purpose by cutting and churning of the soil and by a great excess of eliminated vegetable and bacterial residues, salt and organic chemicals, and water; the feed lot therefore is kept as small as possible. Even in a feeding area not actually defined by fencing, the same damages result from the unavoidable and sustained concentration of all the cattle at the feed troughs. The feed lot therefore is not attractive to sight or smell, and the resulting filth is of harmful effect on the cattle; entering the feed in various ways, it reduces appetite and assimilative ability, produces alimentary-tract infections to obviate which large quantities of antibiotics and the like are routinely placed in the daily feed, and by slowing or preventing weight-gains frustrates to some degree the very purpose of the feeding. Even among cattle in which overt sickness does not occur, there is discomfort which reduces both appetite and assimilative powers. As to antibiotics, there is a growing body of evidence that undesirably large residues of these remain in the meat of the cattle when the meat reaches the consumer, in whom the antibiotics produce effects now beginning to be regarded as possibly serious.

Trench silos are cheaper than above-ground silos, but their use is attended by heavier spoilage losses. They have a seeming advantage in that they can be excavated in such fashion as to permit entry of the animals into one end, there to consume the food directly. This advantage is largely only apparent, and is more than offset by the accompanying fouling and trampling of the stored silage, by extensive spoilage of silage laid open to the oxygen and bacteria, etc. borne by air, and by the same trampling, packing, and over-fertilization of the surrounding ground as before. Some attempts are made to keep feed lots clean and to retrieve the excellent fertilizers lavished upon them; but this again is excessively laborious and time-consuming and requires equipment for cleaning, for hauling, and for eventually placing the fertilizer on cultivated ground; and the valuable urine of the cattle is, of course, not practically retrievable.

While the above refers chiefly to a feeding operation on a farm, much of it is especially typical of a commercial feed lot. In both, some form of feed trough is necessary; and these are expensive, subject to depreciation, often in need of repair, and generally impossible to keep actually clean. Out-of-repair or not ideally designed troughs result in spillage and consequent wastage of food; and lack of cleanliness (typical after a new trough has been in use for more than a few days) encourages alimentary and other diseases among the cattle. As a difference, a commerical feed lot cannot profitably use silage; for the considerable weight and bulk of silage, and its perishable nature when exposed to air, precludes its transportation on any substantial scale from farms to the lot. Instead, the commercial feed lot operator separately buys grain and roughage, which he processes and mixes into a balanced, composite feed or feeds separately, at cost of much labor and expense. The purchased grain, for example, must be cracked by the feed lot operator or his supplier if he desires to counter the tendency of whole grains to pass through the alimentary tracts of cattle and other ruminants largely unchanged and little assimilated. Because of the buying pattern of feeders, the farmers which ultimately produce the purchased feedstuffs plant crops largely of two kinds: fodder crops and grain crops. A grain crop, of course, is allowed to become mature and dry enough for combining before its seed is harvested; the nutritionally valuable chaff is entirely lost, and the remaining portions of the comparatively dry plants tend to be of only marginal value and are ploughed under. Whether the feeding operation employing grain and fodder is commercial or on a farm, expensive buildings must be erected and maintained for storing the feedstuffs purchased or produced. As to fodder, any class of feeder employing it is handicapped by the sharp change in character and loss in food value which results upon the drying of plants; and the small farmer often is not able to pay for the extra labor needed for handling the grain and roughage (or for producing and handling silage, where he attempts to make and use it).

Most of the fresh-state food value of many plants is preservable by ensilaging. Exemplary plants so usable are corn, milo maize, and its relatives; small grain plants such as oats, rye, and barley; and other plants such as clover and alfalfa or even common grasses, with corn probably being the most often ensilaged in the past. While valuable feedstuffs result thereby, incentives for making silage of these materials are much reduced by the factors mentioned above. Milo maize, an especially good feedstuff plant for ensillaging, tends to be less grown in the high-rainfall areas of heavy corn production and is extensively grown in the adjoining sub-humid areas, in which areas the milo maize grows excellently, but in which corn is not a high-producing or reliable crop.

For the reasons stated above grown largely for either grain or for fodder alone, but not for both, milo maize is nonetheless an especially fortunate choice of crop in the sub-humid areas, this largely because of its great resistance to drought which enables it to produce an excellent yield, year after year and with no failures, of grain with 90% the feed value of corn, under climatic conditions in which corn would produce less grain in its few good years and fail in the rest. A large proportion of the feeder cattle of the nation also are grown in or adjacent the sub-humid belt; and both they and milo maize grain with which, at least in significant part, they are later fed tend to be shipped (of course at considerable expense) to feeding centers where they then come together, for fattening the cattle, in commercial feed lots. Much labor, handling, and freight of course would be saved if an earlier encounter were feasible; and much economic advantage would accrue if the substantial wastage of the milo maize chaff, seed-bearing portions, and at least portions of the stalks could be avoided.

It is, accordingly, a major object of the present invention to provide a method for ensiling feedstuff plants which drastically reduces the labor and equipment involved and results in silage of low cost but of excellent quality.

Another object is to provide a method for ensilaging and feeding feedstuff plants which ends the wastage of feed resulting from spoilage of silage upon contact with the air.

A further object is to provide a method of ensilaging feedstuff plant materials which permits feeding the resulting silage in a manner providing economically significant benefit to the land on which the feedstuff plants were grown and eliminating the expense of appropriating land for feed lot purposes and the concomitant injury to the land.

A still further object is to provide a method for ensilaging feedstuff plants which makes it possible to provide cattle and the like with more attractive, comfortable, and hygenic feeding conditions.

Still another object is to provide a method for ensiling feedstuff plants enabling much more economical feeding of dairy animals and wintering and other maintenance feeding of animals, which method in addition enables a single farmer to fatten cattle or the like more cheaply than can a commercial feed lot.

Yet another object is to provide an ensilaging method which makes economically feasible the producing of a balanced feed, containing both grain and roughage, in a single ensilaging operation, thereby saving the expense of combining grain and roughage or feeding them separately and saving nutritious parts of the plants which are lost in combining grain.

An additional object is to provide an ensilaging method which makes possible a sharply reduced use of antibiotics and the like in fattening cattle and other animals.

Another object is to provide an ensilaging method which importantly increases and stabilizes the income and promotes the security and independence of the operator of a one-man or other relatively small farm while enabling him to place into commerce an increased quantity of high-quality meat animals at lower prices.

A further object is to provide ensilaging apparatus readily effecting implementation and accomplishing the results of the method referred to above.

A still further object is to provide apparatus which effects the ensilaging of plant portions in a light, comparatively fragile gas barrier while the latter is transported and which thereafter deposits the loaded barrier on the ground without rupture.

Yet another object is to provide apparatus for filling a light and inexpensive capsule of gas-impermeable construction with a chopped feedstuff material to form a mass well adapted for in situ feeding of meat animals therefrom and of configuration which is contained by a minimum of capsule material, and for depositing the filled capsule on the ground without rupture.

An additional object is to provide an ensilaging apparatus capable of supporting, while it is being filled with relatively finely divided, fresh feedstuff plant material, and of thereafter placing it on the ground without rupture, an ensilaging container with a supported surface too thin to have sufficient strength to resist bursting from weight of the plant material if not widely supported.

Further objects and advantages will be apparent from the specification and claims and from the accompanying drawing.

In perusing the drawing, it must be understood that the figures are not necessarily to scale, especially as to items such as the angles, thin films, reinforcing strips, etc. shown; and that the preferred embodiment and modifications shown are susceptible of wide variation both as to dimensions and as to relations of their parts.

In the drawing:

FIGURE 19 is a plan view of a modification of the receiver;

FIGURE 20 is a cross-sectional view taken as at line XX—XX of FIG. 19;

FIGURE 21 is a rear view of another modification of the receiver;

FIGURE 22 is a diagrammatic, side elevational view of the bottom wall of the receiver of FIG. 21;

FIGURE 23 is a diagrammatic, rear elevation of another modification of the receiver, the door being omitted;

FIGURE 24 is a diagrammatic, side elevational view of the receiver of FIG. 23, the side and top walls being omitted;

FIGURE 25 is a perspective view of a form of relief valve;

FIGURE 26 shows the relief valve in place for closing the front end of the capsule;

Figures 1, 2, 3, 4, 5, 6, 7:
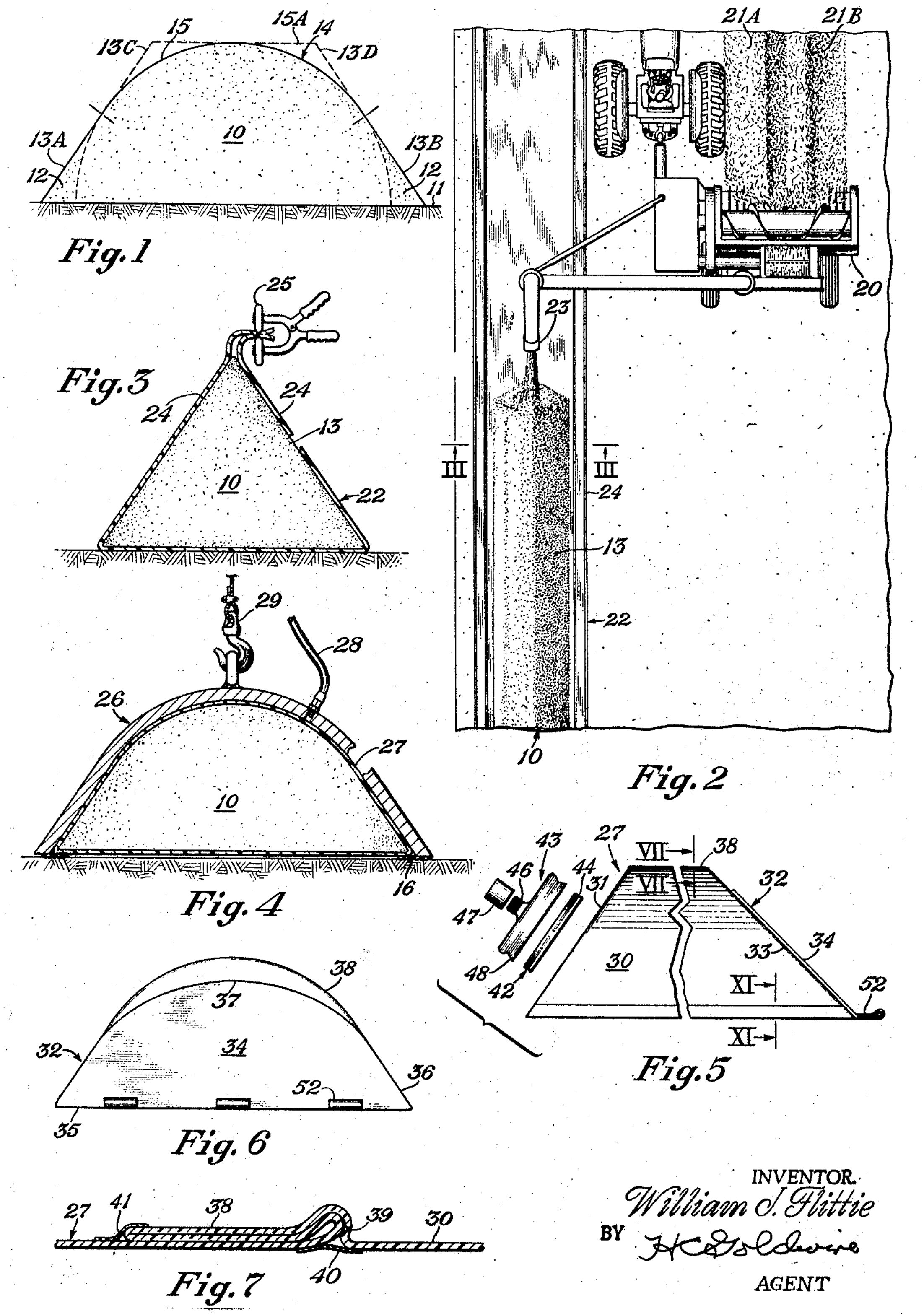
FIGURE 1 is an end or cross-sectional view of a mass of chopped, fresh feedstuff plant material diagrammatically illustrating the theoretical basis for ideal shaping of such mass.
FIGURE 2 is a schematic representation, in plan view, of a mode of implementation of the method of the invention.
FIGURE 3 is a cross-sectional view taken as at line III–III of FIG. 2 and showing closing of a container surrounding a mass of chopped, feedstuff plant material.
FIGURE 4 is a cross-sectional view showing means for placing a container filled with chopped, fresh feedstuff on the ground without rupture.
FIGURE 5 is a side elevational view of an embodiment of the capsule or container.
FIGURE 6 is an end view of the capsule showing the rear closure member.
FIGURE 7 is a fragmentary, cross-sectional view taken as at line VII—VII of FIG. 5.

An important aspect of this invention is that it isolates chopped, fresh plant feedstuff material from air in a housing of minimum cost and preferably in a mass of such shape as to be readily available for consumption of all of its contents by animals, which themselves take the material directly from the mass; at the same time, it eliminates all costs of hauling the feedstuff to the isolating means which are necessary in the case of a silo. For minimum cost of the material of the isolating means, there is employed a thin, flexible, plastic film of thickness and strength so small as to leave it quite incapable of itself supporting any significant part of all the great weight of the mass of feed about which the film constitutes an enclosing capsule. A preferred material for the film is a polyethylene plastic; and many other known plastic films are entirely satisfactory. In addition, a suitable material is a paper sheet waterproofed and made air-impervious by application of a tar-like material, by coating or laminating it with a plastic, etc. Not only is such an isolating means material relatively cheap in itself, but further cost reduction is made possible by employing that material in as thin a film or sheet as is safely usable without risk of serious rupture, thus utilizing a minimum weight of film per square foot. Square footage itself is held to a minimum by shaping the enclosed mass in a configuration which makes possible the transfer of the mass and thin, containing film from a supporting means to the ground without rupture of the film and which configuration also is at or near the shape having, for the volume involved, the least surface area consistent with adequate accessibility of all the mass to feeding livestock.

A given volume of feed has the least surface area, and hence is encloseable by the least square footage of isolating film, where the mass is in the shape of a sphere. Such a shape is unsatisfactory in that the unsupported container could maintain it in such configuration only if it were of extremely heavy and strong (hence expensive) construction; the spherical mass would settle downwardly and outwardly and thus rupture a thin film. This problem is not solved by making the container hemispherical, supported on its flat base; for the hemispherical mass of feed particles is vertical at the ground line and, if unrestrained, downward and outward sliding of the feedstuff particles occurs which bursts a capsule of material thin enough to give economic advantage. Also, aside from the bursting that would occur, the mass would either extend above the feeding height of the animals or would be smaller in volume than frequently is desired; further, not enough animals would at one time have standing room about the mass for eating from it.

The problem of standing room is solved by elongating the mass to a cylinder, but feed in this shape tends to settle and to burst the container in the same manner as a sphere. A half-cylinder is the most economically enclosed shape consistent with providing bottom support over all its width and length and yielding sufficient standing room but, like a hemisphere, presents the problem of falling and sliding of material of the feed-mass and accompanying rupture of the thin, comparatively delicate and fragile film necessary, for most effective cost saving, for its containment.

The ideal solution is found as shown in FIG. 1. The mass of chopped feedstuff 10 is a half-cylinder 14 with its bottom resting on a supporting surface 11. At its juncture with the surface 11, the cylindrical sides of the mass 10 are vertical; and for a considerable distance upwardly therefrom, these sides lie at more than the angle of repose of the feed particles, i.e., the maximum angle at which the particles will stand without sliding. Thus, material of the lower portion of the half-cylinder 14 will slide downwardly and outwardly, accompanied by related sliding and settling of the material thereabove; and this sliding and falling will reduce the volume-containing capacity of and rupture a thin film closely enclosing the the feed. Such sliding and rupture are avoided by adding to each of the sides of the half-cylinder 14 further feed 12 which fills in a volume laterally defined by the lower part of the half-cylinder walls and a plane 13A or 13B which is tangent with the half-cylinder 14 and lying at the angle of repose of the chopped feedstuff. Thus, none of this added material 12 will slide; nor will the material located above it, which material at all locations lies at less than its angle of repose. In such configuration, a film enclosing the mass 10, 12 need be of only nominal strength; for it is supported by (and transfers all downward forces of the feed to) the supporting surface 11, and there are not other forces on it beyond those imposed by its own, scant weight. A very thin, inexpensive film therefore can be employed.

As long as the fundamental concept stated above and reasons underlying it are not lost sight of in shaping the feedstuff mass 10, considerable variation in shape can be effected while obtaining entirely satisfactory results. For example, the angle of repose of chopped feedstuffs varies considerably, depending on factors such as the kind of plant, the fineness of the chop, the water content of the particular plants when chopped, the impact or other packing force exerted on the wet particles when they enter the mass, etc. For this reason, no exact angle of repose can be stated for all feeds, or for even any one feed, under all circumstances encountered in practice. As will be more fully discussed, the invention provides and utilizes means for constraining a thin film to form a container with sidewalls of the height of the added feed 12 and in the planes of the tangent portions 13A, 13B defined above; a flat bottom connecting the lower edges or borders of the sidewalls 13A, 13B; and a top which lies in the arc 15 of the half-cylinder 14 remaining above the points of tangency of the sidewall planes with the half-cylinder. This constraint is imposed while the mass of feedstuff 10 is being deposited in the container and hence imposes the above-described configuration also on the feedstuff mass. For the reason stated above, it is desirable to so fashion this means that the sidewalls of the container (and of the mass therein) lie at a safe and conservative angle somewhat less than the angle of repose of the chopped feedstuff. As an addition and even partial alternative to the above-described constraint, there is provided a loose, empty excess of the film at the top of the mass 10 (as later shown and described); upon the mass being moved and there being some lateral and downward displacement of any of the feed, the film adjusts and accommodates itself to the slightly altered configuration by some of the slack in the loose material being taken up, and bursting is avoided. To this extent, the sides of the mass 10 can therefore be inclined at slightly more than the angle of repose of a particular feed being handled without rendering the operation ineffective. Also, it sometimes is easier or cheaper to construct equipment, for obtaining the desired configuration of the mass, with a flat top, rather than the cylindrical top 15 of the ideal configuration. This is readily effected by extending the sidewalls 13A, 13B further upwardly, as shown in broken line at 13C, 13D, and connecting their upper edges or borders by a flat top wall, shown in broken line at 15A and at the height of the top of the half-cylinder 14. Other heights, of course, are acceptable. Not a prohibitive amount of volume-enclosing ability of a given square footage of the film is lost by this or similar modifications later discussed, in which it is essential to provide sides of the mass approximating the angle of repose of the chopped, fresh feedstuff.

The method of harvesting and ensilaging feedstuff plants comprises the step of moving, over ground and relative to feedstuff plant material borne thereon, a machine which chops the feedstuff plant material and expels the material thus produced. To this end, standing feedstuff plants are first cut and laid in windrows such as shown at 21A, 21B in FIG. 2. Any known machine is employed which will cut as wide a swath as possible and lay the feed in a windrow 21A and preferably, upon its passage back in the reverse direction to cut a second swath across the field, lay down a second windrow 21B adjacent the first, thus forming double windrows. There then is employed a forage harvester or equivalent machine 20 which picks up the still fresh feedstuff plants in the windrows 21A, 21B, chops them finely, and discharges the resulting plant material on an elongated sheet of preferably quite thin, waterproof and substantially air-impervious film 22 laid out parallel to the windrows 21A, 21B and of width sufficient to receive directly from the machine all the bottom area of the pile of chopped feed 10 thus continuously laid down on it, as the machine passes along the windrows, by the feed exhaust spout 23 of the machine. Left free-standing upon its discharge from the spout 23, the elongated mass of chopped feedstuff 10 has sides which lie at the angle of repose of the chopped material. This spout 23 has an end which extends to the centerline of the sheet 22 and preferably is curved to discharge the feed straight downwardly, or at least with no lateral motion, in order that the continued and linearly progressive discharge of feed will build up a long mass 10 which, as shown in FIG. 3, has lateral sides 13 standing at the angle of repose of the chopped, deposited material. The sheet 22 has extra material 24 rolled or folded at each of its lateral margins, and this material extends briefly upwardly to form sides of a container (of which the remainder of the sheet is the bottom) and to restrain any outward creeping of stray material as the mass 10 is deposited; and these sides need not be much, if any, higher than the elevation which is formed by their gathered bulk when the extra material 24 is rolled or folded, for it is not necessary that the chopped feedstuff 10 stand at more than its natural angle of repose. The width of the sheet 22 and the content of the windrows 21A, 21B are coordinated to produce a pile of feed 10 which is not wider than (although it may be narrower than) the sheet portion between the two marginal accumulations of extra material 24. Upon the deposited mass 10 coming to reach the end of the sheet 22, the rolled or folded sides 24 are pulled up to meet at their edges above the contained feed, and the container thus formed is closed as by passing the sheet edges between heated rollers 25 (FIG. 3) to weld them sealingly together. Similar closure is made at the container ends, and the contents are allowed to ferment. One or more relatively small openings, which may be closed with very light one-way valves, are provided in the film to vent out of the container fermentation gases which evolve from the chopped, vegetable material. The entry of air through such openings is prevented by the outflow of gases; if not provided with valves, the openings are closed (as by taping) upon cessation of the outflow of fermentation gases. Each container is made of such length that its fermented contents, namely silage, are consumable, when the container is opened, by the animals available to eat it before spoilage significantly reduces the palatability and nutritional value of the silage. A container is opened, to permit the animals to consume its contents in situ, at a desired time after fermentation; and this is accomplished by simply cutting or tearing the thin film forming the container to expose the feed. The containers are opened at a rate not greater than that at which all the silage then exposed to air will be consumed by the animals before another container is opened.

According to a preferred use of the method, however, the container (as above) receives the chopped, fresh feed directly from the chopping machine, but is moved in coordination with the latter, relative to the ground-borne plant material, as the chopped material is received. An important advantage which accrues to this mode of implementation of the method is that the width of the swath cut by the windrow-making machine is not of prime importance, thus making any of a large variety of available field machines satisfactory for use. Also, the same machine which severs the desired plant portions from standing plants can itself chop them; and other advantages will become evident. The necessary support for the container or capsule, while moving it in association with the chopper along the field, may be supplied by any desired means or, indeed, by hand; preferred means for accomplishing such support and motion, however, will be hereinafter referred to and their implementation of the method made clear. The container is preferably a bag with thin, gas-impervious walls of plastic, paper, etc. and having an open end which is held in position to receive the chopped material from the exhaust duct of the chopper, which material continues to be received until the container is filled to a desired extent. The mass of feed deposited in the container, to prevent later loss by spoilage, must be no more than that which is consumable from the opened container, by the animals available to eat it, before any significant deterioration of the silage occurs. To make possible the use of the thinnest possible gauge of film, it is very important that the deposited mass have sides and ends which lie at respective angles not greater than the angle of repose of the deposited, as yet unfermented feed. As stated above, however, such angle can be somewhat exceeded, to the limited extent that it does not result in enough down-sliding of feed to cause rupture of the capsule. As explained, the providing of extra, slack material of the capsule at its top is of valuable help in this regard.

Following filling of the container, it is at once removed from the means chosen to support and move it and placed on the ground on which the plants were grown, preferably in the very location in which its desired filling was completed. On the ground, fermentation is allowed to begin and proceed. Closing the capsule and providing it with a one-way check valve which vents fermentation gases and prevents entry of air into the capsule preferably is accomplished before placing the capsule on the ground, although this order may be reversed. In depositing the capsule on the ground, it is of vital importance that this be done without disturbing or significantly changing the existing configuration of the feedstuff material mass within it, for unless this configuration is substantially maintained, down-falling feed will generate sideward thrusts which will burst the thin container wall and result in wastage of the feed by scattering and/or spoilage. Any desired means may be employed in accomplishing this transfer; one suitable means is shown in FIG. 4. As previously stated, the deposited, wet mass 10 of chopped feed has sides 13 and ends (not shown) which approximate the angle of repose of the feed; as shown, the mass is made of a size to fit snugly within a shell 26 having sides and ends (not shown) of angle and height to match those of the mass 10. Such a mass 10, if it has a bottom which is 6 feet wide, a height of 4 or 5 feet, a width across its top of about 3 feet, and a length of 8 to 10 feet, will have a weight (depending on its moisture content) in the range of 6,000 to 8,000 pounds. The upward force of the atmosphere on its bottom surface, however, is not much less than 103,680 to 129,600 pounds, a force entirely adequate to lift the entire mass 10. This is accomplished by evacuating air between the interior of the shell 26 and the top, sides, and ends of the capsule 27, through a tube 28 communicating with the shell interior and connected to a suitable vacuum pump (not shown). Suitable seals are previously made (as by pressure-sensitive tape 16 or the like) between the lower edges of the shell 26 and the capsule 27. The shell 26 then is raised by any suitable means 29 from its supporting surface and moved to place the capsule 27 gently on the ground. With the vacuum relieved and any necessary removal of seals effected, the shell 26 is then removed.

The method, in a modification, further comprises supporting a flat, elongated sheet of substantially air-impervious material while moving it relative to ground-borne feedstuff plant material. Suitable means for accomplishing the steps of the method are described hereinafter; and the motion of the sheet referred to above is relative either to standing plants or to portions of those plants cut and laid in windrows. In either event, a field chopper or equivalent also is moved, in coordination with the sheet and relative to the plant material, and during such motion chops the plant material and deposits it on the sheet to form a mass having sides and ends which lie at (or somewhat less than) the angle of repose of the chopped plant material. This angle tends to increase with fineness of chop, with the magnitude of the impact with which each particle enters the mass, and with the wetness of the particles. Wetness can be increased by spraying the plant material with water at a time after chopping and before deposition of the resulting particles in the mass.

The sheet, with the deposited mass on it, then is transferred to the ground, care being taken to maintain substantially undisturbed its aforesaid configuration. The sides, ends, and top of the mass then are covered with an air-impervious material and the latter is sealed to the sheet underlying the mass. In this way, an air-impervious capsule is formed about the ground-supported feed mass. To allow fermentation of the plant material into silage without bursting of the capsule or later contamination by air-borne bacteria, air is prevented from entering the capsule, while fermentation gases are vented to the atmosphere.

The method of ensilaging the feedstuff plants leads to and forms part of the method of feeding, to a given number of animals, all the desired portions of feedstuff plants grown on a particular tract. For best results in the ordinary situation, the number of animals is chosen to provide a group of individuals of such size that, upon all of the silage and any desired feed supplements having been fed to them, they will have arrived at a desired stage in their nutritional histories. Such a stage may be the arrival of another spring and the renewed availability of other feeds; another and important stage is a finished state of fattening for slaughter. These animals, of course, are kept off the tract until the steps mentioned above have been carried out to place all the desired portions of the plant standing on the tract into containers for fermentation. Since the containers are serially filled and each is deposited, at the particular spot where its filling is completed, on the ground on which the crop was grown, they are distributed more or less evenly over the entire tract. At any desired time following completion of the ensilaging process, the chosen number of animals is brought onto the ground, and feeding is initiated by slitting or cutting away the top of one of the containers, or of more than one if the feed-consuming capacity of the particular number of animals is sufficient to enable them to eat substantially all the contents of opened containers before spoilage. Upon the feed thus made available being consumed, another capsule (or capsules) is opened; and this routine is continued until all the encapsulated silage has been fed.

In connection with the above, it is advisable to provide about each capsule, when it is opened, a barrier which will prevent the animals from reaching the feed with more than their heads. This will prveent trampling, fouling, and other wastage of the feed while allowing the animals to consume it directly from the opened capsule; if desired, the barrier may be made to give some support to the capsule as well.

The extensive benefits and advantages of the above-described method will be more fully discussed in later paragraphs, after description has been made of apparatus of great usefulness and value for implementation of the method.

FIG. 5 shows a capsule or container 27 for ensilaging a fresh, chopped feedstuff plant material, which container has a tubular sidewall 30 made of a substantially gas-impervious material such as described; a preferred material is a polyethylene film of 4–6 mils thickness. A thinner (therefore less costly) film sheet is usable; a thicker one, while usable, is more expensive. The sidewall 30 has an open front end 31, through which (as will appear more clearly in later-described figures of the drawing) the chopped feed can be received into it; and a rear end firmly attached to and closed by a closure member 32.

The closure member 32 is of a gas-impervious material a plurality of times thicker, heavier, and less flexible than the sidewall material; it preferably is made of a plate which may be of the same material as that of the sidewall 30, but of higher density. To perform its functions porperly, rigidity or semi-rigidity is necessary in the closure member 32. This is provided by its greater density and thickness, which also gives it an added weight, both being of a utility which will become apparent when considering its cooperation with the receiver (to be described), where the weight must be sufficient to appreciably urge straightening of the tubular sidewall 30 when suspended by its front end 31. The closure member front face 33 is identical with its rear face 34 which, as shown in FIG. 6, has a flat lower border 35 and side borders 36 extending upwardly in mutual convergence and at an angle to the lower border approximating the angle of repose of chopped, fresh feedstuff plant material. It will be realized that, since this angle varies with different materials, no attempt is made in the drawing or specification to illustrate or name any exact angle of repose; however, an angle of about 55 degrees is employed in a preferred embodiment and is satisfactory for use with a number of chopped feeds loaded into the capsule 27 in the manner which will be described hereinafter. It is important to note that, depending on the plants to be ensilaged, the fineness of chop, and other factors, either a smaller or larger angle may be employed; and this is to be remembered wherever the term "angle of repose" is mentioned herein as setting or proximating the angle of any part of the apparatus.

The side borders 36 of the closure member 32, in the preferred embodiment, extend upwardly until (as described in connection with FIG. 1) they come into tangency with a circle the diameter of which lies on the lower border 35; a top border 37 connects the side borders and is formed by the arc of the circle remaining above the points of tangency. The dimensions of the closure member 32 in the planes of its two faces 33, 34 are such that the member fits slideably within a receiver (to be described) and conforms to the shape of the receiver cross-section. Thus, if the receiver cross-section is not shaped to fit the closure member shape described above, the closure member shape must be varied accordingly. In any event, for ready sliding therein, the closure member 32 is of slightly smaller dimensions than and of closely similar shape to the cross-section of the receiver with which it is used.

As shown in FIGS. 5 and 6, the tubular sidewall 30 has sufficient material (shown unrestrained) to be expansible to extend above and hence to have a cross-sectional area appreciably larger than the face area of the closure member 32. The extra material 38 extends the full length of the capsule 27 at its top side and actually is lightly closed off from the rest of the capsule by suitable means. Such means is a narrow strip of adhesive 39 (FIG. 7) attaching together the borders of the folded extra material 38, where it joins the remainder of the capsule 27, and closing it off. Another form of this means employable as an alternative or in addition to the adhesive 39 is a pressure-sensitive tape 40 adhered to the capsule inner surface on either side of and closing off the extra portion 38. In any event, the means utilized to close off this portion must only lightly hold together the closed-off extra material 38 in order that it (when the capsule is filled) may readily yield to free the excess material 38 and let it move downwardly and outwardly upon sliding of any feedstuff along the sides (including the ends) of the feedstuff mass in the capsule. To hold the extra material 38 in folded position relative to the rest of the sidewall before such time, more pressure-sensitive tape, etc. may be employed as shown at 41 in FIG. 7. Even without the excess material 38, the capsule 27 must be expansible to a cross-sectional area at least slightly larger than that of the receiver with which it is to be used.

Figures 8, 9, 10, 11, 12, 15, 17, 18:
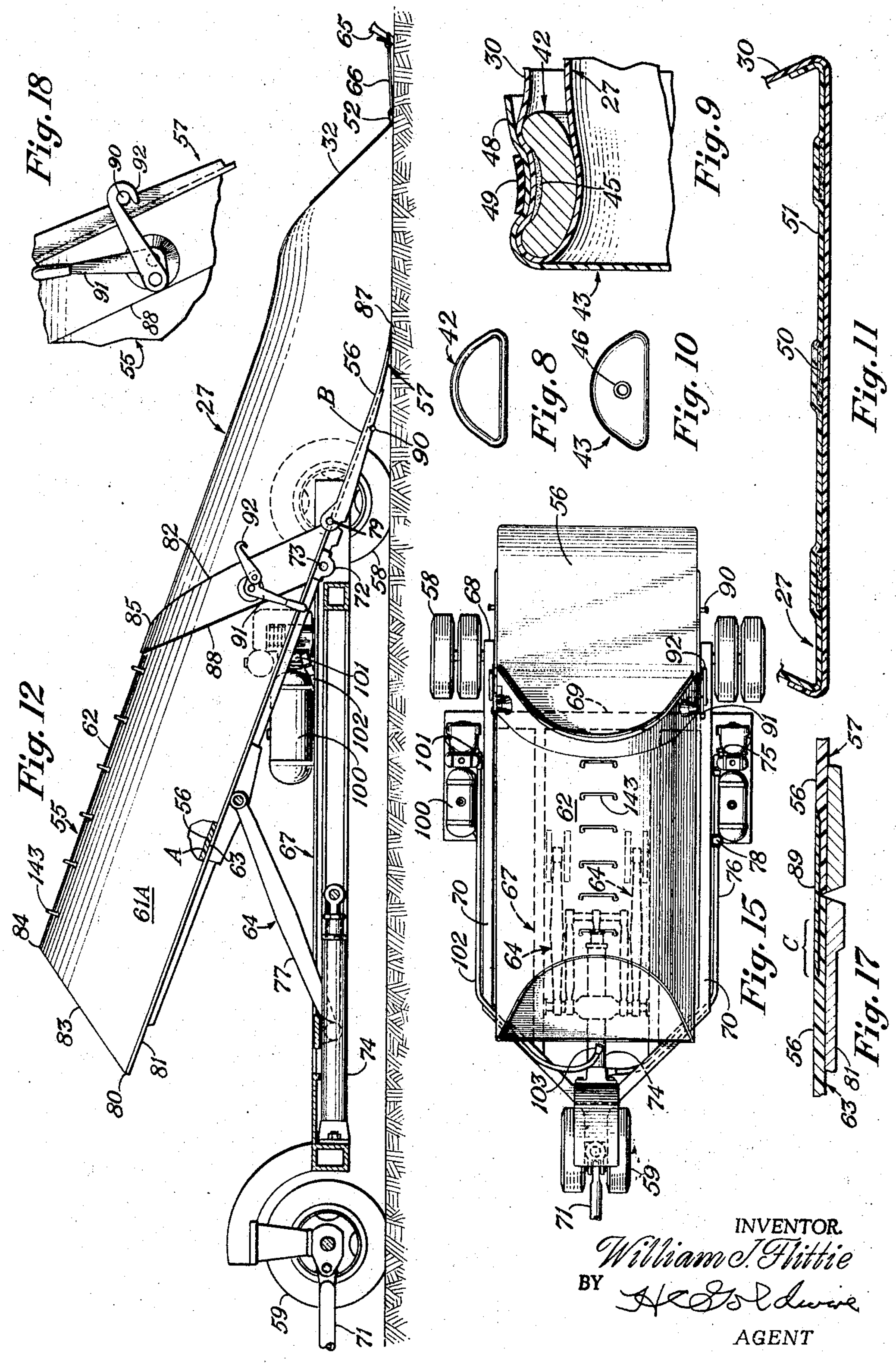
FIGURE 8 is a plan view of the ring.
FIGURE 9 is a fragmentary, cross-sectional view showing the ring and plate installed for closing the front end of the capsule.
FIGURE 10 is a plan view of the front face of the plate.
FIGURE 11 is a cross-sectional view of the bottom portion of the capsule taken as at line XI—XI of FIG. 5.
FIGURE 12 is a side elevational view of the receiver and its mounting and tilting means, the receiver being in an unloading position.
FIGURE 15 is a reduced-size, plan view of the apparatus of FIG. 12.
FIGURE 17 is a fragmentary, diagrammatic view of a mode of effecting smooth juncture between the receiver bottom wall and door upper surfaces.
FIGURE 18 is a fragmentary view of an upper, rear corner of the receiver showing the door locked in its closed position.

Means are provided for closing the tubular sidewall open end 31 (FIG. 5) after the capsule 27 is filled, to a desired extent, with chopped, fresh feedstuff plant portions, this to prevent entry of air into the capsule and spoilage of the feed. In the preferred embodiment, a rigid ring 42 (FIGS. 5, 8, 9) is preferably of the general shape of the rear closure member 32 and has, at its peripheral face, a peripheral groove 44 preferably containing on its wall a pressure-sensitive adhesive 45 (FIG. 9). The ring 42 may be made of steel or other strong, rigid material. While not shown, a paper strip or equivalent may be employed to cover the adhesive 45 until the ring 42 is ready for use. To close the container 27 after it is filled, there is brought into contact with the walls and bottom of the groove 44 a portion of the tubular sidewall 30 having a surface area extending around all the periphery of the tubular sidewall, either on the interior or exterior of the latter. Preferably, as shown in FIG. 9, the ring 42 is placed around the loose, unfilled material of the sidewall 30 remaining at the front of the capsule 27, and some of this material then is folded back around the exterior of the ring and pressed into the groove 44, the adhesive 45 of which urges retention of the sidewall material in place.

Cooperating with the ring 42 is a plate 43 (FIGS. 5, 9, 10) made of, for example, a semi-rigid, high-density, gas-impervious plastic and provided with an opening therethrough adapted, as by a cylindrical, threaded portion 46 encircling the opening, for receiving a one-way check valve 47. The plate 43 has a peripheral flange 48 sized to snap over, by elastic yielding of the plate material, the material of the sidewall 30 covering the peripheral face of the ring 42 and having an inner surface shaped to complement that face and enter into the ring groove 44 over the sidewall material. Means such as a tightenable wire, cable, or band 49 are employed to encircle and lie within the ring groove 44 and to compress the flange 48 tightly toward the ring 42, thereby bringing the peripheral surface area of the capsule 27 held by the adhesive 45 in close, fixed contact with the ring and effecting a substantially air-tight seal of the capsule. The check valve 47 preferably is threaded to engage and close off the plate cylindrical portion 46 and is of such construction as to be closed when pressures at each side of it are in equilibrium and to open to allow escape of gases in the container 27 under only a little more than atmospheric pressures. The valve 47 therefore provides a channel of one-way communication extending from the interior to the exterior of the capsule 27.

The dimensions of the ring 42 and plate 43 are such that, when mated as in FIG. 9, their largest dimension is not greater than the corresponding dimension of the closure member 32, the ring and plate providing an overall shape corresponding to that of the latter. Such dimensioning is important to make the just-described means for closing the tubular sidewall open, forward end 31 freely moveable, without binding, within and longitudinally of the receiver (to be described). Actually, the ring 42 and plate 43 preferably retain the general shape of the rear-end closure member 32, but are of somewhat smaller plan-view dimensions, this to reduce the required quantities of the heavier and more expensive materials of which they both are made. Preservation of the shape mentioned, in the front-end closure means, however, is of importance in that it facilitates making a closure of the capsule front end 31 which is symmetrically related to the cross-sectional shape of the filled capsule 27 and thus tends to distribute and transfer evenly to material of the sidewall 30 any forwardly directed forces imposed on it by forward falling of some of the feed, if this should occur; in addition, it minimizes the amount of material of the sidewall 30 needed for cooperation with the ring 42 and plate 43 for closing the capsule 27.

The means for providing groundward motion of the capsule, later described in full, comprise in part at least one reinforcing element, such as 50 (FIG. 11) extending substantially the length of the tubular sidewall 30. As shown, the reinforcing element or elements 50 are attached to the bottom of the tubular capsule 27; similar, additional elements may be provided on the sides, if and as required by any particular usage. Each element 50 is cemented or otherwise firmly affixed to the inner surface of the capsule material; or, as shown, a construction of the capsule 27 is employed in which the capsule bottom wall is made of double thickness by overlapping and cementing together the material of which it is made, and reinforcing elements 50 are readily positioned within the overlap 51 and secured by the same cement bonding the two thicknesses of material of the tubular sidewall 30 thus produced. The overlapped material 51 increases strength of the capsule bottom, as do the reinforcing elements 50; and these reinforcing strips 50, when adapted for attachment to a pulling force as by connecting means such as rings or loops 52 (FIGS. 5, 6) make readily possible the application to the capsule 27 of an external force tending to slide it rearwardly on a surface on which it is supported. Each reinforcing element 50 is made of paper, parallel plastic or glass fibers, or other relatively strong material.

The apparatus for ensilaging a vegetable feedstuff material, for example, chopped, fresh milo maize seedheads and other desired portions from the standing plants, further comprises means for supporting and moving the capsule 27, relative to and adjacent the ground and the fresh plants standing or lying thereon, in position for receiving chopped plant portions as they are expelled from a means severing feed from the plants or (where the fresh plants lie cut) picking them off the ground. While further reference is later made to preferred fineness of cut under and for certain conditions and purposes, it will for the present suffice to state that the plant material may be deposited in the capsule 27 in the condition in which it exists immediately upon being severed from the plants, or it may be still more finely divided, supplied with additives, etc.

FIG. 12 shows means such as called for above, which means includes structure 55 forming an upwardly facing surface 56 for supporting the bottom side of the capsule 27 above the ground; this structure 55 in turn has a rear end, formed by the rear edge of a door 57 which is positionable in contiguity with the ground. It will be seen that the surface 56 is in contact with the capsule 27 along most of the capsule length (i.e., all of that length which becomes filled with the chopped feed) during deposition of the feedstuff therein. At initiation of transfer of the capsule 27 from the surface 56 to the ground, this surface is in a tilted attitude, for example as shown in FIG. 12, in which the capsule longitudinal axis is substantially displaced from the vertical; as the capsule moves to the ground, this axis becomes horizontal. Wheels 58, 59, disposed in supporting relation to the structure 55, provide for the motion necessary for the preferred use of the capsule 27.

Figures 13, 16:
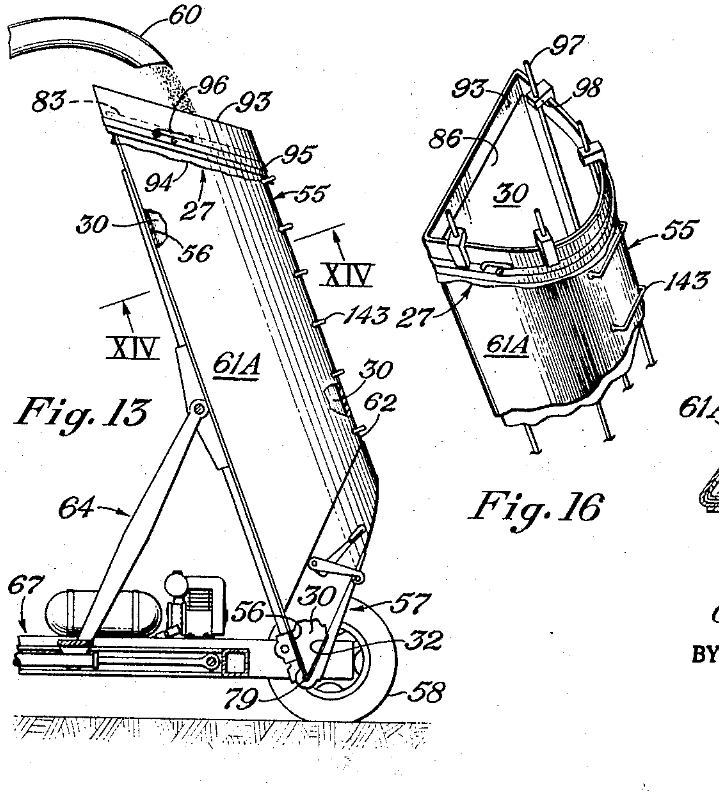
FIGURE 13 is a view similar to FIG. 12, but with the receiver tilted to a greater angle and with the feed discharge spout in place.
FIGURE 16 is a perspective view of the open front end of the receiver of FIG. 13 showing use of the positioning rods.
Figure 14:
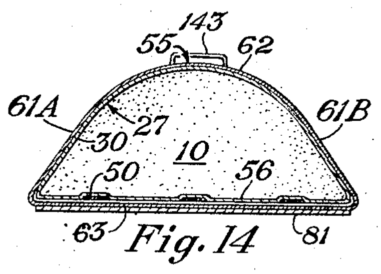
FIGURE 14 is a cross-sectional view taken as at line XIV—XIV of FIG. 13.

The feed discharged from the spout 60 (FIG. 13) of a conventional severing and chopping device is impelled by and entrained in an airflow which is directed by the discharge spout into the capsule 27, which it enters with considerable kinetic energy. The means of FIG. 12, shown in FIG. 13 in a filling position, support and position the capsule or container 27 for receiving the airflow and entrained, chopped feedstuff material, meanwhile constraining the container 27, by means of walls of the receiver or structure 55 in which the container is mounted, against outward forces and to a configuration characterized (with added reference to FIG. 14) by a flat, elongated base conforming to the supporting surface 56, and sides connected by a top surface conforming to the shape of the receiver sidewalls 61A, 61B and top 62. The receiver sidewalls 61A, 61B form an opposing pair which slope inwardly and upwardly from the lateral borders of and each lie at an angle to the receiver bottom wall 63 (hence, to the base of the feedstuff mass 10 built up within the container 27) that approximately and preferably is somewhat less than the angle of repose of the feedstuff received. As shown in FIG. 13, the capsule rear end closure member 32 lies flat against the closed door 57, and the base of the feedstuff mass 10 (FIG. 14) in capsule 27 with sidewall 30 is parallel with the flat, lower border 35 (FIG. 6) of the closure member 32, which slidably fits in the receiver 55. As shown in FIG. 12, the supporting means provided by the receiver 55 is positionable for effecting sliding of the filled capsule 27 directly to the ground, after (as in FIG. 13) supporting it in spaced relation with the ground during its filling. As shown at 64, there are provided means for tilting the receiver 55 for accomplishing the transfer of the capsule 27 from its supporting and positioning means 55 to the ground while, as will be seen, the height of the sides of the mass 10 remain roughly unchanged, thus avoiding imposition of serious bursting forces on the capsule 27. The transfer means may also include means such as a stake 65 and ropes 66 (FIG. 12) which place a pulling force on the one or more rings or loops 52.

The receiver 55 is carried by a ground-contacting mobile support or transport means that supports the receiver 55 and carries it along the ground. As shown in FIGS. 13, 15, the support means comprises a chassis 67 with a front end with one or more wheels 59 and a rear end mounted between wheels 58 relatively widely spaced to provide good lateral stability for the receiver 55, particularly when in its loading position. The chassis 67 has a heavily built member with a pair of spaced, rearwardly extending legs 68 (FIG. 15) joined at their forward ends by a crosspiece 69. In order that the chassis 67 (and hence the receiver 55) may be spaced as near the ground as is practicable, the rear wheels are relatively small. To prevent their tending to sink in loose earth from the rather great weight of the silage placed upon them, the rear wheels must provide a relatively quite wide tread surface; this is effected, and lateral stability is further increased, by mounting double wheels 58 on the rearward end of each leg 68.

Extending forwardly of the crosspiece 69 for a distance preferably greater than the length of the receiver is structure preferably in form of two members 70 well spaced apart at their respective points of rigid attachment to the crosspiece 69 and extending forwardly therefrom with a final mutual convergence which brings them together at the chassis forward end, on which is steerably mounted the front wheel or wheels 59. The chassis 67 may be made self-propelled by suitable motor means (not shown); otherwise, a drawbar 71 or equivalent is provided for pulling and steering it, preferably by the same tractor or the like that draws the means for severing and chopping the feed. As shown in FIG. 12, means such as bored lugs 72 are provided on the rear end of the receiver 55 for pivotally mounting it on the chassis 67. The receiver 55 is at its rear end encircled by and securely and rigidly attached to a heavy ring 88 bearing the lugs 72, one on each side of the receiver, which journal laterally extending shafts 73 mounted on the chassis 67. Because of the considerable, filled weight of the receiver 55, care must be taken to locate these lugs 72 far enough forwardly relative to the chassis 67 to ensure that the center of gravity of the vehicle, necessarily high when the receiver is at or approaching its filled condition, will never be far enough to the rear to make possible a backward tipping of the vehicle. Preferably, the mounting means 72 lie forwardly of the supporting surface end portion formed by the door 57; in the specific embodiment, the mounting means 72 are located well forwardly of the centers of the rear wheels 58.

Also mounted on the chassis 67 are the means 64 for pivoting the receiver 55 comprising, for example, a hydraulic actuator shown at 74 in, for example, FIGS. 12, 15. The piston of the actuator 74 is moveable by supplying the actuator cylinder with hydraulic fluid from a motor-driven pump 75 through a hydraulic line 76. Movement of the piston of the actuator 74 results in actuation of a linkage 77, which may be of any conventional or desired form, to raise the receiver 55, as shown in FIG. 13, to its loading position. A valve 78 in the hydraulic line 76 is closeable to lock the receiver 55 in this or any intermediate position, and merely opening the valve 78 slightly is sufficient to lower the filled receiver, no motive power being needed for this purpose. For safety purposes and positive stability without excessively strong hydraulic components, it also is desirable to provide a positive, mechanical device for ensuring that the receiver 55 will remain locked in its upper, loading position if the hydraulic lock provided by valve 78 should fail. One versed in the art will readily supply such a lock, which accordinlgy is not shown or further described. The means for cutting the desired quantity of feedstuff plant material and depositing the same in the capsule 27 through its front-end opening, while the capsule is supported and moved along the ground by the transport means 67, is preferably a field chopper drawn by the same tractor, etc. drawing the chassis 67. The chopper may be of any conventional or desired construction but preferably chops the severed feedstuff finer than usual in order that, being wet, it will tend to pack and cling together somewhat upon experiencing the impact which brings it to rest within the capsule 27, thus increasing its angle of repose and facilitating its forming a mass closely conforming to the bottom, top, and sides of the configuration in which the capsule 27 is constrained by the receiver 55. Also, the finer cut is of significance in that it promotes faster and more thorough and uniform fermentation; and seeds in the feed are better ingested if their hulls are crushed. Modification of existing choppers to provide a very fine division of the plant pieces is readily accomplished by employing additional power, a screening fitting for effecting further chopping of over-sized particles, etc. in the chopper, as is known to those versed in the art. The chopper has the usual discharge duct, extended as necessary, with a spout 60 positioned to direct the chopped feed, entrained in a vigorous airflow, into the capsule 27 mounted within the receiver 55.

A means for injecting added water, a feed supplement, etc. into the chopped feed as it is being deposited in the capsule 27 comprises a tank 100 (FIG. 15) containing the desired injectant in liquid solution or suspension and a motor-driven pump 101 which impels the liquid from the tank 100 through tube 102 and nozzle 103 to spray it onto the feed during its deposition in the capsule 27. Later labor for providing the sprayed material to the cattle is thereby saved, and dispersion of the material within the chopped feed is made uniform. The size of the tank 100, of course, is varied as appropriate.

To return to the structure 55 (FIG. 12) which defines and provides the elongated supporting surface 56 mounted on the transport means 67, this structure has an elongated portion A which is formed by the receiver bottom wall 63 and which defines the major part of the supporting surface 56, the rear end of this longer portion A being formed by the bottom wall rear edge (in register with the door hinge 79). As noted, the structure longer portion A is pivotable, in the vicinity of its rear end, relative to the transport means 67 and about a transverse axis 73 lying forwardly of the structure end portion B formed by the door 57. This end portion B itself forms a lesser, but important, part of the supporting surface 56 and is pivotable between a first position in which, as shown in FIG. 12, it is in contiguity with the ground and a second position (FIG. 13) in which it extends upwardly to block motion of the capsule 27 along the supporting surface longer portion A. In the embodiment shown, and in any embodiment in which the capsule 27 slides along the supporting surface 56 in being transferred therefrom to the ground, it is important that the supporting surface 56 be smooth throughout, in order to avoid tearing the bottom of the capsule 27 and to reduce friction between the supporting surface, formed by the receiver bottom wall 63 and door 57, insofar as possible. The same applies, if to somewhat less degree, to the receiver sidewalls 61A, 61B (FIG. 14) and even to some extent to the top wall 62. It is the supporting surface 56 (FIG. 12), however, which imposes the greatest amount of frictional load on the capsule 27. This surface 56, as well as the inner surface of the sidewalls 61A, 61B and top wall 62, may be the very smoothly finished surface of a glass fiber and resin composite of which the receiver 55 and its door 57 are made, or these parts may be made of (or lined with) a metal with smoothly finished inner surface. To promote sliding of the capsule 27, lubricants may be employed, and the inner surface of the receiver bottom wall 63 may be provided with shallow, rounded longitudinal channels into which such lubricants may be supplied. Another and very effective means of reducing friction to a minimum is to line the receiver inner surface of the receiver 55, or at least the inner surfaces of the bottom wall 63 and door 57, with an inherently slick and tough material such as one of the poly(tetrafluorethylene) plastics widely known as "Teflon."

To describe the receiver 55 in further detail, this tubular structure must contain and bear the weight of the relatively wet and quite heavy, chopped feed and hence must be of strong construction. To give needed strength at its bottom wall 63 (which extends the length of the receiver 55), this wall may be made of thicker, heavier material or may, as shown, be reinforced by a sturdy plate 81 which, for example, has longitudinally extending stiffeners and is made of steel. The plate 81 is rigidly attached to and preferably covers all of the bottom surface of the receiver 55. To this plate 81 is attached the linkage 77 of the means 64 for pivoting the receiver 55 between its unloading position (FIG. 12), in which (with the door 57 in its second position) the substantially flat inner surface of the receiver bottom wall 63 and inner surface of the door 57 form a substantially continuous, sloping surface extending from the interior of the receiver 55 to the ground, and its loading position (FIG. 13) in which the receiver front end is raised to increase further the slope of the bottom wall 63. To prevent binding or increase in friction between the capsule 27 and receiver 55 in the region where the sidewalls 61A, 61B (FIG. 14) meet the bottom wall 63, it is desirable to break the angularity of wall intersection slightly by forming these intersections on a small radius.

Inclined inwardly and upwardly from the lateral borders of the bottom wall 63 at an angle to the bottom wall approximating the angle of repose of the chopped plant material, the pair of opposed sidewalls 61A, 61B have respective rear edges such as 82 (FIG. 12), each of which joins the bottom wall rear edge and slopes forwardly and upwardly from the bottom wall at a slope best always less than the feedstuff angle of repose. Similarly, the sidewall front edges 83 extend at a rearward slope to the planar bottom wall 63, and from the front edge 80 thereof, at angle which approximates the angle of repose of the feed. The top borders of the two sidewalls 61A, 61B (FIG. 14) are of equal height and preferably are located, at any point along the length of the receiver 55, by employing the principles discussed in connection with FIG. 1.

In the embodiment described, the upper and bottom walls 62, 63 are rearwardly divergent from each other, as are the two sidewalls 61A, 61B, a total divergence of around one or two inches being sufficient if the receiver is, for example, ten feet long. The top wall forward edge 84 (FIG. 12) joins the sidewall front edges 83 and cooperates with them and the bottom wall forward edge 80 to form a rim defining the receiver front end and the opening 86 (FIG. 16) thereinto. The top wall rear edge 85 (FIG. 12) similarly cooperates with the sidewall rear edges 82 and bottom wall rear edge to form a rim defining the rear end of the tubular portion of the receiver 55, and its rear-end opening from which the filled capsule 27 issues, which opening is positioned well inboard of the rear wheels 58 to prevent sideward tipping which would otherwise be possible.

The door 57, as seen in side view in FIG. 12, may be flat, but preferably is made concave adjacent its upper or free edge 87 (which edge of course is downward when the door is fully opened), and a corresponding curvature is given to the sidewall rear edges 82 in order that the door 57, when pivoted to its first position, will snugly close the receiver rear opening. In its second position, the door 57 extends downwardly and rearwardly from the receiver 55 and is pivoted to a position in which its upper edge 87 comes to lie below the remainder of the door and to rest on the ground.

The means for pivotably mounting the door 57 relative to the receiver 55 is of any convenient form which leaves the inner surfaces 56 of the receiver bottom wall 63 and door 57 substantially continuous with each other, thereby avoiding tearing of the capsule 27 when it is unloaded, and which permits pivoting of the door between its abovementioned first and second positions. A construction ensuring a satisfactorily smooth juncture between the bottom wall 63 and door 57 is shown in FIG. 17 and is used in connection with a door mounting arrangement of any conventional kind in which the pivot line is flush with the inner surface 56. At and near its rear edge, the bottom wall 63 is reduced in thickness, a similar reduction being made near and at the front edge of the door 57. These two reduced-thickness portions, which extend the width of the bottom wall, are restored to their original thicknesses by covering them with a piece 89 of strong, pliable, slick material such as the plastic known as "Teflon." The plastic piece 89 is preferably feather-edged at its rear end, and a feather edge may be formed in the inner surface 56 of the bottom wall 63 to overlie the other end of the piece 89. This piece 89 is rigidly fixed, in an area C at its front end, to the bottom wall 63; the rest of it is free to move and bend upon pivoting of the door 57 relative to the bottom wall 63.

Any desired means is employed for locking the door 57 in its first, closed position. An exemplary means is shown, in FIGS. 12, 18, as comprising a stud pin 90 in each outer edge of the door 57. A toggle 91 mounted on the receiver reinforcing ring 88 is moveable for pulling forwardly a piece with a hooked end 92 engaging the pin 90 to thus clamp the door 57 tightly shut; or the toggle 91 is moved in the reverse direction to loosen the hook 92 on the pin 90 and allow it to be disengaged therefrom for releasing the door 57.

To permit deposition of chopped plant material in the capsule 27, means are provided for rigidly fixing its front-end opening in coincidence with the front-end opening of the receiver 55. This means comprises a flexible sleeve 93 (FIG. 13) which is slipped over and into an encircling relation to excess material 94 of the capsule 27 defining the capsule open end and turned back, in the manner of a cuff, over the front-end rim 83 of the receiver 55 to place the material 94 in outwardly encircling, rearwardly extending relation to the receiver front end opening defined by the rim 83. For allowing complete filling of the receiver 55 without spilling, the sleeve 93 preferably extends somewhat forwardly of the receiver 55. About the sleeve 93 extends a clamping ring 95 connected to and tightenable by a toggle 96 to clamp the sleeve 93, and underlying material of the capsule 27, securely on the front end of the receiver 55. The sleeve 93, of course, could be omitted and the cuffed material 94 of capsule 27 held by the clamp ring 95 alone.

The just-described means for holding the front end of the capsule 27 also serves to hold the flexible, tubular sidewall 30 of the capsule, when placed in the receiver 55 and clamped as described, in a configuration generally corresponding to the interior shape of the receiver. With the receiver 55 elevated as in FIG. 13, the weight of the material of the sidewall 30 and the added weight of the rear-end closure member 32 tend to pull the sidewall straight; and the receiver front rim 83 by which the capsule is suspended and the rear-end closure member 32 urge the capsule to seek the same shape as the interior of the receiver. Beyond this, airflow from the severing means spout 60 inflates the capsule 27 and pushes its thin, flexible sidewall material against the walls of the receiver 55. In case it is ever needed, further means for constraining the capsule sidewall 30 to conform generally to the interior shape of the receiver 55 are readily provided in the form of rods 97 (FIG. 16) of glass fibers, steel, etc. The sleeve 93 bears spaced, forwardly facing, block-type members 98 with axial openings in which the rods 97 have a close, sliding fit and through which they can be inserted into the capsule 27 in such positions that they aid in holding the sidewall 30 in adjacency with the interior surfaces of the receiver 55. The rods 97, of course, are withdrawn when the capsule 27 has been filled. It is to be stressed that the dimensions of the capsule 27 are somewhat greater than the interior dimensions of the receiver 55, this in order that significant stretching and bursting forces will not be placed on the capsule as it is filled.

The tubular receiver, as so far described, has walls 61A, 61B, 62, 63 (FIG. 14), each of which preferably is made in one, continuous piece as to itself and with the other walls. In an important modification of the invention, however, the top wall 62 (FIG. 19) is divided along its length into two, separable portions 110A, 110B, the confronting edges of which portions are formed to provide mating surfaces which are separable by outwardly moving the upper borders of the two sidewalls 61A, 61B relative to each other. Such movement preferably is made possible by constructing the receiver 55 in one piece and of a resilient material, such as steel or a glass fiber and resin composite or laminate, the construction being such that the receiver, with no outside forces imposed on it, stands with its top wall mating edges spaced from each other, as shown in FIG. 20, the construction being springy enough to allow elastic yielding of the receiver material for bringing the mating edges of the top wall portions 110A, 110B together as in FIG. 19. Alternatively, the construction may be such that the mating edges lie together in the position shown in FIG. 19 until forcibly sprung apart to provide a gap therebetween as shown in FIG. 20; or a hinged construction may be employed to allow movement of the mating edges of the separable portions 110A, 110B relative to each other for opening and closing the gap. Care must be exercised to so locate or cover any hinging employed as to not present a sharp or rough surface that will be in contact with the capsule during its sliding egress from the receiver 55.

Means are provided for making the receiver 55 rigid by locking the mating surfaces of the top wall separable portions 110A, 110B in their closed, mated position. Any means which locks the mating edges in close, mutual contact or, as will be described, to clamp a portion 38 (FIG. 20) of the capsule 27 between them, is satisfactory. A preferred means is toggles 111 pivotably mounted on one of the separable portions and each having at its free end a hook 112 for engaging a pin 113 on the other separable portion 110A. When the toggle 111 is actuated in one direction, the edges of the separable portions 110A, 110B are locked in mating relation as in FIG. 19; swung to its other position, it allows these portions 110A, 110B to spread as in FIG. 20. In this latter position, the toggle 111 serves as a rigid connection between the separable portions 110A, 110B which prevents any further outward travel of the upper borders or edges of the sidewalls 61A, 61B relative to each other. When desired, the sidewalls 61A, 61B can be sprung inwardly toward each other sufficiently to allow disengagement of the toggle hook 112 from the pin 113, whereupon the toggle can be pivoted on its pivot 114 to provide unimpeded access to the gap which then opens into the receiver interior.

A large part 38 of the excess material of the capsule 27 extends through the gap, in the arrangement shown in FIG. 20, and is held in place on one of the receiver top wall separable portions 110A or 110B by suitable means such as swinging, spring clamps 115 actuable for holding or releasing the excess material 38 and located on the upper surface of the top wall 62. A longitudinal portion 38 of the flexible, tubular sidewall of the capsule 27 thus is held in place after the capsule is placed in the receiver and before the toggles 111 are actuated to mate or close the edges of the separable portions 110A, 110B and thus clamp the material of the capsule extending therebetween. In so clamping this material, the mating edges form a means for closing off the longitudinally extending capsule excess portion 38 from the capsule interior, which portion is opposite and extending longitudinally of the capsule base, in the position in which it is mounted in the receiver 55. By so clamping and shutting off the excess material 38, that material is temporarily prevented from being filled with the feed stuff particles when they, entrained in an airflow or otherwise impelled, are directed into the capsule 27. In order that they may clamp material of the capsule 27 firmly but without damage, the mating edges preferably are faced, as shown at 116, with rubber or other yieldable material.

Many modifications of the invention are possible while remaining within its concept and principles, and the brief examples noted below are only several out of the large number possible in the areas touched upon, as well as in other areas.

In a modification of the receiver, a major portion of the elongated supporting surface 56 (FIG. 12), namely that surface provided by the receiver bottom wall 63, is permanently slanted at a fixed angle to the horizontal. This is accomplished, in the embodiment shown in FIG. 15, by permanently closing the hydraulic valve 78 and thus locking the receiver in fixed position; or, the linkage 64 may be replaced by structure equivalent thereto but not permitting pivoting of the receiver away from an inclined position. In such modification, the angle of inclination of the receiver 55 to the horizontal is one in which, when the door 57 is moved to its second position (in which its free edge rests on the ground), the filled capsule will gently slide in the receiver toward the ground; or, the inclination is less than this, but not so great that the capsule cannot be readily caused to slide by applying a rearwardly directed force to it by a ground-attached rope 66 (FIG. 12), etc. As in all modifications employing the downwardly swinging door 57, the receiver and door inner surfaces 56 form one substantially continuous supporting surface when the free edge of the door rests on the ground at the time it is desired to unload the filled capsule 27 from the supporting structure.

In FIG. 21, there is shown a modification in which the receiver has a rear-end closure in form of two laterally swinging doors 57A, 57B releasably held in their closed position by any suitable latch means 117 and pivotably mounted on the receiver as by hinges 118. The supporting surface 56 provided by the inner surface of the receiver bottom wall, in this modification, is shown schematically in FIG. 22 as pivotably mounted on structure 72 (such as the lugs 72 of FIG. 12) located at a fixed interval from the ground as by mounting on the chassis already shown. Means 64 such as the tilting means 64 of FIG. 12 are employed to move the supporting structure (of which only the bottom wall with surface 56 is shown in FIG. 22) between a position X in which its lower edge is in contiguity with the ground and in which the capsule is then unloaded and a position Y of less or zero slant, in which the capsule can conveniently be placed in position in the receiver of which the bottom wall forms a part. The end portion of the supporting structure 55 is thus variably spaceable from the ground. It will be noted that, in this modification, the supporting structure 55 is rigidly fixed relative to its rear end portion, no downwardly swinging door being employed.

In the modification shown in FIG. 23, the bottom wall 63 of the receiver is formed by the upper course of an endless belt carried on rollers, the rear roller, which has a fixed shaft 120, being shown at 119. The upper wall 62 is split along its length, and on one top wall portion 110C a plate 121 is rigidly mounted in such position that it lies in flat, sliding contact with the upper surface of the other wall portion 110D. Lying closely adjacent and parallel with the top surface of the plate 121 is a second plate 122 which is rigidly fixed relative to the wall portion 110D and which, like the plate 121, extends substantially the length of the top wall portions 110C, 110D. There is thus formed a slot in which the plate 121 rides when the sidewalls are moved from a first position, shown at Z in broken line, in which the two top wall portions 110C, 110D are in mutual contact, and a second position in which those portions are separated.

Seen in side view in FIG. 24, the roller 119 is one of a spaced, parallel pair over which runs at endless belt 123. The rollers 119 are driven by any suitable motor means (not shown) to provide circulation of the belt 123; or they are left undriven by other than rearwardly directed forces imposed on the belt upper course through a filled capsule supported thereon, such forces being developed on the capsule by gravity when the structure thus formed is tilted as shown and supplemented, where desired, by fixing the rear end of the capsule relative to the ground as shown in FIG. 12 and moving the belt-carrying rollers 119 forwardly from under the capsule. Accordingly, the rollers 119 are mounted (for example, as on a wheeled chassis as shown in FIG. 12) for support above and movement over the ground (as is the modification shown in FIG. 22). The rollers 119 (FIGS. 23, 24), of course, extend transversely of the transport means employed. A plate 124 is of the width of and located between the courses of the belt 123; its two ends preferably are cylindrically formed to fair smoothly into the rollers. This plate 124 is rigidly attached, as by bars 125, to the spaced shafts 120 on which are rotatably mounted the rollers 119. Toward its rear end, the plate 124 is pivotally mounted as by shafting 126 on a fitting 127 providing means for pivotable attachment to a chassis such as shown in FIG. 12. A similar fitting 128 is mounted on the plate toward its forward end for attachment of tilting means such as shown at 64 in FIG. 12. By such means, the structure formed by rollers 119 and belt 123 is tiltable between a position shown, in which the rear one of the rollers 119 is in contiguity with the ground, and another position in which the plane of the upper course of the belt, shown in broken line at W, is more nearly horizontal. The rear roller 119 thus can be raised from the ground in order that the belt 123 will not be in ground contact while the structure is being moved during filling of a capsule supported on the elongated surface formed by the upper course of the belt 123. As shown in FIGS. 23, 24, the plate 124 has mounted on each of its lateral edges a plurality of outwardly and upwardly extending members 129 which slidably extend through snugly fitting openings in the lower edges of the sidewalls 61A, 61B. Upon the sidewalls being moved outwardly relative to each other on these members 129, they and the top wall portions 110C, 110D are also moved upwardly relative to the supporting surface provided by the upper course of the belt 123. Therefore, relative to a filled capsule container in the receiver 55 while the sidewalls 61A, 61B and top wall portions 110C, 110D are in their first position Z, the sidewalls and top wall portions are movable, as shown, to a second position in which they are out of contact with the capsule. The capsule thereupon may be translated relative to those walls without frictional contact with them.

Similarly, modifications may be made in the capsule; for example, the capsule forward end can be closed, after filling, by employing a one-way check valve 130 (FIG. 25) which is adapted for having material of the capsule sidewall open end fastened closely and sealingly about it by providing it with an elongated shell with an inlet end and outlet end. Secure fastening thereabout of the capsule material is facilitated by providing an annular, reduced-diameter portion 131 intermediate the ends of the shell. Fastening can be effected, as shown in FIG. 26, by tying with wire or cord 132, etc. Also, the check valve 130 may be located in positions other than or in addition to the ends of the capsule.

While it is generally contemplated herein that the desired portions of the feedstuff plants (such as the seedheads and parts of the stalk and/or leaves) are cut from the standing plant by means which chops them and deposits them directly into the receiver-supported capsule, it has been noted that the invention also comprehends the procedure wherein the plant material is cut and left on the ground by one machine, as in windrows, and subsequently lifted from the ground by another machine which chops it and deposits it in the moving capsule or container. Also, "fresh" plant material is often referred to herein. While this term primarily refers to plant portions just cut from still juicy, growing plants, it also refers to such portions cut from drying but still standing plants, or partly dried after being cut from the plants, but still fresh enough to make silage. In this regard, the addition of water to the chopped plant material in the filled capsule, where this will facilitate ensilaging fermentation, is contemplated; and plant material thus ensilageable is regarded as still fresh.

Figures 27, 28:
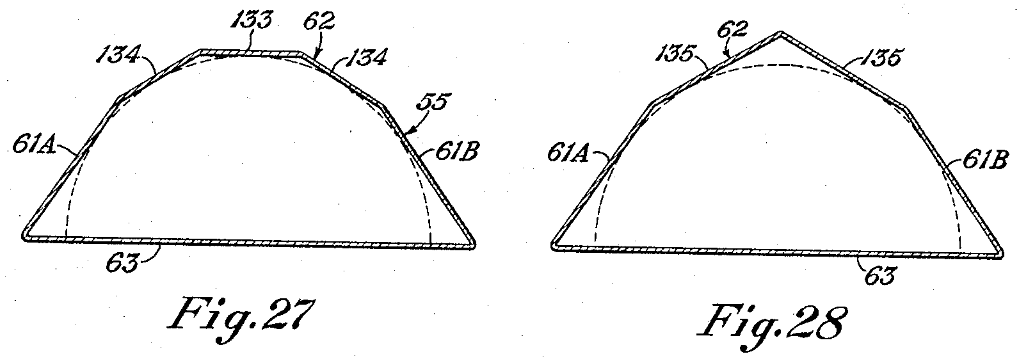
FIGURE 27 is a cross-sectional view of a modification of the receiver.
FIGURE 28 is a similar view of another modification.

FIG. 27 shows an alternate cross-sectional shape of the receiver 55 wherein the sidewalls 61A, 61B, as before, are generally tangent to a semicircle the diameter or base of which lies on the inner surface of the bottom wall 63 and which sidewalls lie at an angle to the bottom wall approximating the angle of repose of the chopped feedstuff to be deposited therein. The top wall 62 has a portion 133 which is approximately tangent to the semicircle and parallel to the base, which portion is connected to the sidewalls 61A, 61B by a pair of inclined portions 134, the angle of which to the bottom wall 63 is less than that of the sidewalls to the bottom wall. Each of these two portions 134 preferably comes into impingement upon a respective point of the periphery of the semicircle.

Another alternative cross-sectional shape of the top wall 62 is shown in FIG. 28 wherein the sidewalls 61A, 61B are angled as before and the top wall is formed in two mutually inclined portions 135, each of which preferably impinges on a respective point lying in the periphery of the semicircle. In each of the cross-sectional shapes of the receiver shown herein in FIGS. 27, 28 there is mutual, rearward divergence between the top and bottom walls 62, 63 as well as between the two, opposed sidewalls 61A, 61B; or, in the alternative, the top wall 62 is divided into separable portions as shown at 110A, 110B in FIG. 19. Either construction is employable in any of the receiver configurations shown; and, of course, both may be employed in a given construction where desired to give the ultimate minimum of binding between the capsule and receiver at time of discharge of the capsule.

Figures 29, 30, 32:
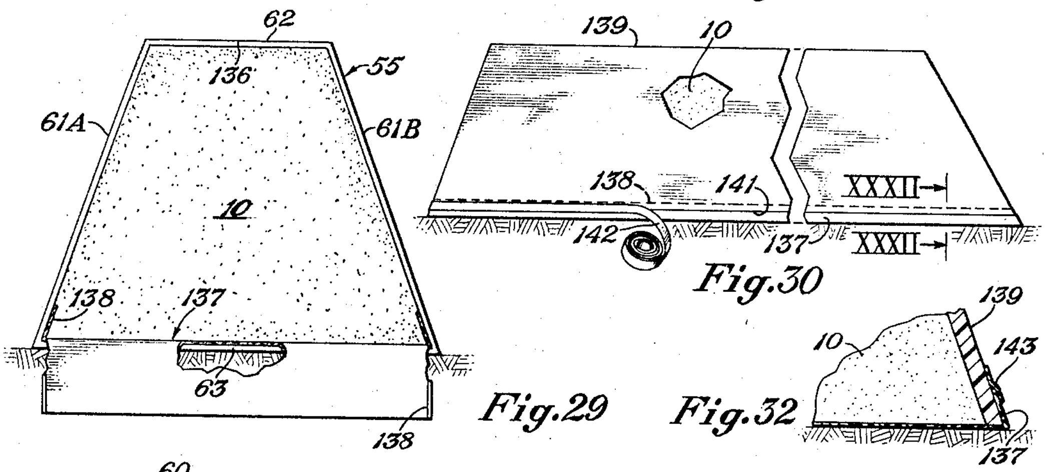
FIGURE 29 is a rear-end view of the bottom portion of a modification of the capsule in place in one of the receivers.
FIGURE 30 is a side elevational view of the capsule bottom of FIG. 29 as assembled with the material for covering the top, sides, and ends of the feedstuff mass.
FIGURE 32 is a fragmentary, cross-sectional view of a modification of the capsule taken as at line XXXII—XXXII of FIG. 30.

FIG. 29 illustrates an important modification of the device wherein the receiver 55 employs a construction generally similar to that already described. As shown, the top wall 62 may be divided, as at 136, into two portions laterally moveable relative to each other, whereupon suitable means for clamping them together, as already described, are employed. Alternatively, or additionally, the top and bottom walls are rearwardly divergent from each other, as are the sidewalls. As a further alternative, any one of the receivers previously described is employed. Covering the inner surface of the bottom wall 63 is a capsule bottom wall 137 which has upturned side portions 138 that extend the length of and briefly upwardly along the sidewalls 61A, 61B. The side portions 138 preferably extend, as shown, to the end of the capsule bottom wall 137, which extends rearwardly of the receiver 55 far enough to permit its being grasped by a suitable clamp or equivalent and pulled, as by the stake and rope 65, 66 (FIG. 12) from the receiver 55 when the latter is in its unloading position. The capsule bottom wall 137 (FIG. 29) is made, for example, of a paper that is waterproofed and made gas-impervious by impregnation or coating it with a plastic or other suitable material. Because of the considerable strength of paper, for example, such pulling permits unloading the feed mass from the receiver at quite a shallow angle to the ground which, as also in the case of the capsule 27 already described, often can be considerably less than the angle shown in FIG. 12. Before sliding the capsule bottom wall 137 (FIG. 29), hence the feedstuff mass 10 thereon, out of the receiver, the side and top walls 61A, 61B, 62 are moved away from the feedstuff mass as shown in FIG. 20; or, where diverging walls (as described) are employed, these permit the feedstuff mass to move rearwardly within the receiver.

In filling the receiver 55 of FIG. 29, a finely chopped feedstuff is employed as already described, it being borne in mind that quite fine division of the feed is a factor influencing it to stand at a high angle of repose. This angle is also increased by cutting the feed when quite juicy or, if the plants have been allowed to become more mature, by spraying water or a liquid feed supplement into the feed as it is hurled into the receiver 55 by the chopper spout airstream. When the receiver 55 is sufficiently filled, it is unloaded by placing its rear edge (formed by the receiver bottom wall 63 or by the receiver door, not shown) in contiguity with the ground and holding the rear end of the capsule bottom wall in fixed position relative to the ground while the receiver, as in FIG. 12, is moved forwardly from under it. The relatively wet feedstuff on the capsule bottom wall 137 (FIG. 29) finely chopped and compacted into a mass by the force with which it is hurled into the receiver 55, retains its configuration during the unloading.

With the feedstuff mass 10 on the ground, as in FIG. 30, the sides, ends, and top of the mass are covered with a thickness of a water- and gas-impervious material 139 and the upturned portions 138 of the paper or other material forming the capsule bottom wall are held up against the feedstuff mass in a position such as shown in broken line. The rear-end material of the capsule bottom wall 137 is similarly moved upwardly and against the feedstuff, in the same manner as is extra material 140 (FIG. 31) at the front of the capsule. The feedstuff mass 10 thus is covered by an impervious, plastic material 139 having an edge 141 (FIG. 30) extending all around the mass near its bottom and overlapping the upturned borders of the bottom wall 137. The capsule is sealed as by applying an adhesive tape 142 which covers all the lower edge of the upper material 139 and extends sealingly onto the bottom wall 137, which of course can be made of any suitable waterproofed, gas-impervious material as an alternative to paper. On the other hand, the material covering the top and sides of the mass 10 also may be made of waterproofed, gas-impervious paper. A very thin plastic of around 2 millimeters in thickness is preferred however, because of its low cost; and, in a preferred embodiment of the material, is cut or moulded to a predetermined shape which fits the feed mass 10.

In a modification shown in FIG. 32, however, the material 139 is made of a relatively heavy plastic of 10 millimeter or even greater thickness. When using such a construction, it is most convenient to effect closure, as shown, by placing the upper material 139 over the feedstuff mass, then folding the bottom wall 137 upwardly against it and effecting a seal between them with a tape 143. In the modification shown in either FIG. 30 or FIG. 32, a one-way valve or other suitable means (such as a slit which is taper closed after fermentation is complete) is used to vent fermentation gases out of the capsule while preventing the entry of outside air. After fermentation, the capsule of either of these figures is opened by removing the sealing tape 142 or by cutting or tearing the capsule. In the case of the construction of FIG. 32, the material 139 covering the top, sides, and ends of the feed is kept intact and saved for use again in following years; the thin upper material 139 of FIG. 30 is discarded.

Many aspects of the implementation and use of the method, and of the operation of the apparatus, have already been discussed, and only certain remaining aspects will be described below.

With reference to FIG. 12, the tilting means 64 is ordinarily actuated to place the forward end of the receiver 55, during its transport into position in the field where it is to operate, even lower than the position shown. The capsule 27 then is placed in the receiver 55, and this is conveniently effected by inserting the capsule through the opening of the receiver at its front end and while the receiver is tilted to a large angle with the horizontal equaling or exceeding that shown in FIG. 13. In making such installation of the capsule 27, the receiver door 57 is first closed and locked as in FIG. 18, and the rear closure member 32 (FIG. 5) is inserted first into the receiver 55 and allowed to fall, a hold being maintained on the front end 31 of the capsule. As a result, the closure member 32 moves to the rear end of the receiver 55 (FIG. 13), where it lies flat against the door 57 and, by its weight, tends to position and straighten the capsule sidewall 30 within the receiver. The excess material 94 at the capsule front end is turned back over the front end of the receiver 55 in the manner of a cuff, and the sleeve 93 and capsule clamping ring 95 are installed as described. Rungs 143 or equivalent are provided on the receiver 55 to facilitate access to the opening at its forward end. To avoid the imposition on it, while in the receiver 55, of unsupported forces tending to tear or burst it, the capsule 27 is so installed as to leave a degree of slack between its ends; and its circumference is somewhat greater than that of the interior of the receiver. Where found necessary for proper positioning of the capsule 27, the rods 97 are put in place as shown in FIG. 16. With the receiver 55 in a preferred loading position, which often is approximately that shown in FIG. 13, the receiver is impelled through the field and relative to the feedstuff borne on the ground thereof by its own source of motive power, if such is provided, or by a tractor, etc. and in coordination with a machine which, as described, chops the feedstuff and deposits it in the capsule 27 as through a spout 60. The feed is preferably impelled by an airflow in which, as it leaves the spout 60, it is entrained, and its relative wetness and considerable velocity upon impact within the receiver 55 causes a degree of packing and coherence with other feedstuff particles which results in there being built up, within the capsule 27, a mass 10 (FIG. 14) in which the chopped feed has a rather high angle of repose. The kinetic energy of feed particles when they enter the capsule, and the increase of fluid pressure arising from the airflow within which they ordinarily are entrained, as well as the weight of the deposited particles, results in forces which tend to move the feedstuff radially outwardly relative to the capsule 27; and the latter is constrained, by the receiver 55 containing it, to a configuration in which the deposited feedstuff (since it then must conform to the capsule) forms an elongated mass having a substantially planar base coinciding with the lower, longitudinally extending side of the capsule, the latter being supported by the receiver bottom wall 63. The sides of the mass 10 slope inwardly from the base of the mass and are bounded by side portions of the capsule which are in turn supported by the spaced, elongated members provided by the receiver sidewalls 61A, 61B; thus, the feedstuff mass has sides that, at substantially all locations thereon, lie at an angle which (upon regarding the planar base of the mass 10 as a reference horizontal) is between an angle approximating the angle of repose of the feedstuff and a lesser angle. Within limits already stated, however, the invention is still operative if it should happen that the angle of the sides of the mass 10 somewhat exceeds the angle of repose of the feedstuff. Similarly, the top of the mass 10 is shaped by the receiver top wall 62, acting through the support against outward forces it gives the capsule 27; thus, the sides of the mass are connected by a top of less slope, relative to the bottom of the mass, than the sides. The end of the capsule 27 is similarly constrained by the door 57 (FIG. 13) to a slope less than the angle of slide of the feedstuff, the receiver bottom wall upper surface 56 being taken as a reference horizontal. The receiver 55 is filled until the feed roughly forms a slanted plane which is parallel to and approximately level with that in which the forward edges of the walls of the receiver 55 lie; or the receiver is left somewhat less than completely full to allow for any downfalling of feed at its forward end upon the receiver being tilted to its unloading position.

In placing the capsule 27 in the modification of the receiver 55 shown in FIGS. 23, 24, the procedure outlined above is ordinarily the most convenient; similar installation of the capsule is made, in the other modifications of the receiver, in the mode most convenient in each case. The receiver 55 of FIGS. 19, 20 for example, is conveniently provided with a capsule 27 by placing the receiver in an approximately horizontal position and with the toggles 111 disengaged and swung on their pivots 114 to provide free access to the longitudinal opening thus provided as shown in FIG. 20, between the top wall separable portions 110A, 110B. The capsule 27 is placed in the receiver 55 through this opening, stretched out within the receiver, and its excess material 38 clamped on one of the top wall portions 110A or 110B by the spring clamps 115. The open front end of the capsule 27 is secured, as before, at the front end of the receiver 55, after the top wall relatively moveable portions 110A, 110B are brought together by the toggles 111 to clamp material of the capsule 27 between them. If not already accomplished, the receiver door 57 is then locked in its closed position, and filling of the capsule 27 with the chopped feedstuff commences as above. The cheap, readily expendible capsule 27, when filled to a desired extent directly from the chopping machine as it moves through the field, is itself all that is needed to contain the feed for its fermentation and later feeding; thus, all the expense of machinery and labor for hauling the feed to a silo is saved, as is the cost of the silo itself, the machinery for conveying the feed into and out of it, and of feed troughs.

The filled capsule 27 preferably is closed at its front end, as described in connection with FIG. 9, while the capsule remains in the receiver 55, although this may be accomplished after depositing the capsule. Other closure means may also be employed, for example the means of FIGS. 25, 26; or the extra material of the capsule 27 at its front end may simply be tied shut by a cord, etc. as long as provision is made for venting fermentation gases while preventing entry of outside air into the capsule. Since the container 27 is sealed as soon as filled, the encapsulated feed is not subjected to the drying, exposure to bacteria, etc. it would encounter in the previously necessary intermediate hauling and handling incident to placing the feed in a silo.

Figure 31:
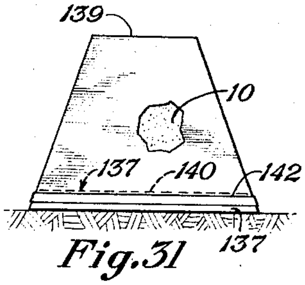
FIGURE 31 is a front-end elevational view of the capsule of FIG. 30.

The filled capsule 27 is placed on the ground in the spot where it becomes filled by lowering the receiver 55 to an angle at which the capsule preferably will not, of itself, slide. The door 57 then is opened to bring its upper edge 87, as in FIG. 12, into contiguity with the ground. The tilt of the receiver 55 is then increased enough to cause the capsule 27 to slide rearwardly until its rear end is in ground contact, and the receiver is moved forwardly from under it. In the preferred operation, however, the unloading angle is much reduced (for example, to considerably less than that shown in FIG. 12) by employing a pulling means such as the stake 65 and rope 66 attached to the capsule 27 as already described. A similar procedure is employed for unloading the filled capsule 27 from the other disclosed modifications of the receiver; for example, the receiver of FIGS. 21, 22 is unloaded by tilting it to an angle in which its rear end is in ground contiguity, then opening the doors 57A, 57B and allowing the capsule to slide to the ground under influence of gravity and/or a pulling force applied as already described. In the modification shown in FIGS. 23, 24, friction on the bottom of the capsule 27 is reduced to a minimum by action of the belt 123 and rollers 119. The modification of FIGS. 19, 20 is unloaded similarly to that of FIG. 12; before rearward motion of the capsule 27 relative to the receiver 55 is effected, the toggles 111 are loosened and the sidewalls 61A, 61B laterally spaced from each other to take them and the top wall portions 110A, 110B out of contact with the capsule. Also, the extra capsule material 38 is freed beforehand by opening the clamping devices 115. In all modifications, it must be borne in mind that the capsule 27 has a bottom, longitudinally extending side along all its major dimension, and that that side is made of a relatively thin and fragile material which would be immediately subject to rupture upon the filled capsule being supported while any significant area of its bottom side is deprived of support. Virtually continuous and uninterrupted support is provided to all the bottom side of the capsule 27 during its transition, as described above, between the receiver 55 and the ground; with relative motion between the capsule and the supporting surface provided by the receiver to bring the capsule rear end into ground contact, an initial part of the capsule comes to rest on the ground without ever having experienced lack of support, having at all times received such support from either the receiver or ground. Moving the receiver 55 forwardly and from under the capsule 27 continuously increases the ratio of the bottom-side portion of the capsule supported by the ground to the portion still supported by the upwardly facing surface of the receiver until all the capsule is ground-supported. Rupture of the bottom of the capsule 27 thus is prevented. Since the sides and ends of the feedstuff mass 10 are at an angle to the ground which approximates the angle of repose of the feed, the mass substantially retains the shape imposed upon it by the receiver 55, and rupture of the relatively fragile capsule 27 by downfalling of feed is avoided. The same results are obtained in unloading the filled receiver 55 when employing the capsule bottom 137 shown in FIG. 29, although the capsule preferably is not completed (as shown in FIGS. 30–32) until after unloading is accomplished.

As to the feedstuff 10 which is placed, as described, in the capsule 27, this may be either picked up by the associated machine from a windrow and then chopped, or the machine may be any one of the available field choppers, etc., which severs the feedstuff directly from standing plants and chops it. For maintenance feeding, substantially all the plant extending above the ground is employed. For fattening animals by feeding to them a seed-bearing crop such as milo maize, the seedheads are employed, together with desired portions of the stalk which vary in quantity according to the desired richness of the prospective silage. By varying the depth of cut as successive capsules 27 are filled, silages within a given range of richness are readily produced for appropriate utilization in the feeding program. In any case, the nutritionally valuable chaff lying about the seeds is saved. Further, the use of a number of individual capsules 27 makes it possible for one man to accomplish the entire silaging operation in leisurely fashion without danger of drying or other deterioration of feed before filling and closing of a silo. If desired in order to vary the characteristics of the resulting feed or simply as a matter of convenience, it is readily possible to cut the crop at varying degrees of maturity.

When the filled capsule 27 has been placed on the ground, its interior is soon purged of fresh air by the large volumes of fermentation gases (largely of carbon dioxide) which soon evolve. These gases are vented as described, and prevention of the entry of air into the capsule 27 obviates secondary bacterial actions which otherwise would result in the formation of a slimy, spoiled layer such as forms in the top portion of feed in a silo; consequently, the general palatability and nutritiousness of the resulting silage is excellent. Distending of the capsule 27 by fermentation gases reduces wind whippage of the capsule material and allows it to yield readily and thus escape puncture from hail; freedom from hail damage is subsequently provided by the yielding support given the capsule material by the silage after fermentation has subsided. Complete protection of its contents from water, dust, etc., is provided by the capsule 27. Similar protection of its contents, and freedom from hail damage, is provided by the capsule shown in FIG. 32.

When the animals to be fed on the silage thus produced are brought into the field, the only labor essentially needed to make the feed available to them is that required for opening successive capsules as the feed therein is needed for consumption. At the time a capsule is opened, however, it is desirable to place about it a simply constructed and portable barrier or frame which allows the animals access to its contents, but which prevents them from trampling or fouling the feed. By slitting or removing only its top, a capsule forms a clean and convenient feeding trough; after the feed is all consumed, the capsule is discarded. If its top portion is made of a heavier material as shown in FIG. 32, however, this portion may be stored for successive reuses in later years. In either case, the expenses of a silo, and of the labor and machinery for filling it, are avoided. While a silo and such machinery can only be depreciated, for tax purposes, over an applicable number of years, a disposable capsule is immediately deductible from gross income, for all its cost, in the year of use.

Since the silage is fed, in the spaced locations where the capsules become filled and unloaded, on the very ground where the silage was produced, no separate feedlot is necessary. A given area of ground experiences a sustained, high concentration of the fed animals for only several days, hence is not injured; and the relatively even distribution of all the elimination products of the animals over all the field is highly beneficial to the land and is obtained at no cost. A further result is that the animals have clean and attractive feeding and living conditions which maintain their health and appetites, and little or no antibiotics, etc. need be introduced into their feed. Meanwhile, if feed supplements are desired, these are readily introduced at the time of depositing the feed in the capsule, or such introduction is accomplished by placing the supplements on the finished silage after each capsule is opened. The combination of healthful feeding conditions and a feed of superior palatability and food value results in maximum assimilative powers and gain of the animals fed. Since the capsules are opened in coordination with the nutritional demand of the group of animals fed, there is no spoilage and consequent wastage of the feed; and all the heavy labor and expense of removing feed from a silo and transporting it to feed troughs is saved, as is the labor and expense of storing and feeding grain and fodder.

The invention offers especially important economic advantage to farmers in the sub-humid areas of this and other countries, i.e., areas without consistently sufficient rainfall to ensure good yields of corn, but with rainfall sufficient to produce profitably other feed crops, notably milo maize. Since these areas are large relative to the areas of high corn production, and since it is in them that much of the feeder livestock production takes place, the livestock thus are readily on hand for feeding. Upon resolving uncertainties and variables in favor, in each instance, of the higher figure, the 1966 cost per animal being fattened, to a farmer employing the present invention, is no more than 25¢ per day, the elements of such cost including land taxes, plowing, seeding, cultivation or equivalent, fertilizer, harvesting into the capsule or container, and feed supplements, this where a 30-bushel per acre milo maize crop is produced. (In some areas, a 60-bushel crop is reliably produced.) Feeding 700-pound yearling cattle over 150 days with a normally good weight gain of 2½ pounds per day, and with a sale price for finished beef animals of $22/100 after a purchase price for feeders of $20/100, the net on each animal is $59 per head, or approximately $40 per acre of the land on which the crop was produced. By contrast, a farmer selling only the seed from the same crop, at a price consistent with the beef prices noted above, could expect a net return of only $13 per acre. In further contrast, the cost of feeding cattle in a commercial feedlot is not less than 50¢ per animal per day. Thus, the operator of even a one-man farm is enabled, by the invention, to fatten cattle at a price giving him a greatly superior competitive advantage over a commercial feedlot operation. Meanwhile, since milo maize (for one example) is a highly reliable crop under year-to-year changes in weather conditions, the income of the farmer is not only greatly improved, but is stabilized. At the same time that his security and economic independence are increased, he is enabled to place into commerce an increased quantity of high-quality meat animals at lower prices, thus providing needed benefit to the ultimate consumer.

While only one example of the method and a single embodiment of the apparatus of the invention, together with modifications of each, have been disclosed herein, it will be evident that still other modifications are possible in its steps and in the arrangement and parts of its components without departing from the scope of the invention.

I claim:

1. Apparatus for ensiling feedstuff plant portions in a closeable capsule of substantially air-impervious construction, said apparatus comprising:
   means for supporting the capsule and for moving the same relative to ground-borne feedstuff plant material;
   means for chopping the feedstuff plant material and depositing it in the capsule while the same is being moved relative to the ground-borne material; and
   depositing means for supporting the capsule while effecting movement of the capsule from the supporting means to the ground for fermentation of the feedstuff plant material therein, a part of the depositing means including the means for supporting the capsule.

2. Apparatus for ensiling feedstuff, said apparatus comprising:
   means movable relative to ground-borne feedstuff plant material for chopping and expelling the same;
   a closeable container of substantially air-impervious construction;
   means for supporting the container in position for receiving the plant material as it is expelled from the chopping means and until the container is in contact with the ground; and
   means for effecting movement of the container from the supporting means and to the ground upon the container having received the plant material.

3. Apparatus for ensiling feedstuff plant material in a capsule made of a thin, flexible, substantially air-impervious material and having a lower, longitudinally extending side and an opening, said apparatus comprising:
   ground-contacting transport means for providing support above and movement along the ground;
   structure which has an end portion moveable into contiguity with the ground and which defines an elongated supporting surface, said structure being mounted on the transport means;
   means for maintaining the capsule in a position in which its opening is accessible and it lower side is supported by said surface;
   means for chopping a desired quantity of the feedstuff plant material and for depositing the same in the capsule through its opening while the capsule is supported by the supporting surface and moved along the ground by the transport means; and
   means for effecting groundward motion of the capsule relative to the supporting surface while the structure end portion is in contiguity with the ground, whereby the capsule lower side is progressively brought into contact with an support by the ground.

4. The apparatus of claim 3, the structure having a longer portion defining a major part of said supporting surface and the end portion defining a lesser part of the supporting surface, the end portion being pivotable relative to the longer portion between a position contiguous with the ground and a position in which the lesser part of the supporting surface extends upwardly to block movement of the capsule along the structure longer portion, all the supporting surface being smooth.

5. The apparatus of claim 4, the longer portion having a rear end adjacent the end portion and being pivotable, in the vicinity of its rear end, relative to the transport means and about a transverse axis.

6. The apparatus of claim 3, said structure comprising:
   a pair of spaced, parallel rollers extending transversely of the transport means and at least one of which rollers is moveable into contiguity with the ground; and
   an endless belt extending between and mounted on the rollers, the elongated supporting surface being formed by the upper course of the belt.

7. The apparatus of claim 3, at least a major portion of the elongated surface being slanted at a fixed angle to the horizontal.

8. The apparatus of claim 3, the structure being rigidly fixed relative to said end portion thereof and said apparatus further comprising means for tilting the structure for variably spacing the end portion from the ground.

9. The apparatus of claim 3, the elongated supporting surface being formed of a low-friction material.

10. The apparatus of claim 3, further comprising means for constraining the capsule, against forces tending to move the cut feedstuff deposited therein in an outward direction relative to the bag interior, to a configuration wherein the deposited feedstuff, in filling the capsule, forms an elongated mass having a substantially planar base coinciding with the lower, longitudinally extending side of the capsule and sides sloping inwardly from the base and bounded by side portions of the capsule, the sides of the mass, at substantially all locations thereon, each lying at an angle which, upon regarding the substantially planar base as a reference horizontal, lies between an angle approximating the angle of slide of the cut, deposited feedstuff and a lesser angle, the sides being connected by a top of less slope than the sides.

11. The apparatus of claim 10, the means for constraining the capsule having mutually spaced, elongated side members positioned for bearing against and defining the shape of the capsule sides during deposition of the feedstuff in the capsule and which are thereafter movable from each other for thereafter reducing friction between them and the capsule.

12. The apparatus of claim 10, the means for constraining the capsule having mutually spaced, elongated side members which are located and shaped to bear against and define the shape of the capsule sides and which are mutually convergent along a direction extending away from the structure end portion.

13. An apparatus for ensiling a vegetable feedstuff in a capsule having a bottom side extending along its major dimension and made of a thin, plastic material subject to rupture upon said capsule, when substantially filled with the feedstuff, being supported while its bottom side is substantially deprived of support, said apparatus comprising:

means for supporting the capsule bottom side above the ground and including structure forming an upwardly facing surface and having a rear end positionable in contiguity with the ground;

means for substantially filling the supported capsule with the vegetable feedstuff; and means for effecting relative motion between the capsule bottom side and said surface while the structure rear end is contiguous with the ground to bring a portion of the capsule bottom side into contact with and support by the ground and for continuously increasing the ratio of the bottom-side portion supported by the ground to the bottom-side portion still supported by the upwardly facing surface until all the bottom side is supported by the ground.

14. Apparatus for ensilaging feedstuff plant material comprising:

a capsule made of a thin, flexible, substantially air-impervious material and having a lower, longitudinally extending side and an opening;

ground-contacting transport means for providing, for the capsule, support above and movement along the ground;

structure which has an end portion moveable into contiguity with the ground and which defines an elongated supporting surface, said structure being mounted on the transport means;

means for maintaining the capsule in a position in which its opening is accessible and its lower side is supported by said surface;

means for cutting a desired quantity of the feedstuff plant material and depositing the same in the capsule through its opening while the capsule is supported by the supporting surface and moved along the ground by the transport means; and means for effecting groundward motion of the capsule relative to the supporting surface while the structure end portion is in contiguity with the ground, whereby the capsule lower side is progressively brought into contact with and support by the ground.

15. An apparatus for ensilaging a chopped, fresh vegetable feedstuff, said apparatus comprising:

an elongated capsule having a longitudinal axis and made of a plastic film;

means for depositing chopped, fresh feedstuff in the capsule;

means for supporting the capsule in spaced relation with the ground during deposition of the feedstuff therein and for thereafter initiating and completing transfer of the capsule to the ground while continuing to support the capsule until substantially all the capsule rests on the ground, said means comprising a surface which is in contact with the capsule along at least most of its length during deposition of the feedstuff therein and which surface, at least upon initiation of transfer of the capsule to the ground, supports the capsule in an attitude wherein its longitudinal axis is substantially displaced from the vertical; and means for venting, from the feedstuff-containing capsule, gases under extra-atmospheric pressures while substantially preventing the entry of air into the capsule.

16. The apparatus of claim 15, said apparatus further comprising means for moving the apparatus adjacent a standing growth of the fresh feedstuff and said means for depositing chopped, fresh feedstuff in the capsule having the further function of severing desired portions from the standing feedstuff and chopping the same as the apparatus is moved adjacent thereto.

17. Apparatus for ensiling, in an elongated, tubular container made of a thin, flexible, substantially air-impervious material and having an open end, freshly chopped foodstuff plant material entrained in an airflow, said apparatus comprising:

means for supporting and positioning the container for receiving through its open end the airflow and entrained, chopped foodstuff material and for constraining the container, against outwardly directed forces imposed on its inner surfaces thereby, to a configuration in which it has a flat, elongated base and further has sides extending upwardly from borders of and sloping inwardly of the base and forming an opposing pair each having an angle to the base approximating the angle of repose of the chopped feedstuff after being received into the container;

means for temporarily preventing, during reception of the air-flow and entrained material into the container, filling with the feedstuff particles of a portion of the container material located opposite and extending longitudinally of the base; and means for effecting transfer of the container from the supporting and positioning means to the ground while maintaining generally unchanged the height of the sides of the mass, whereby outward thrust of any chopped feedstuff falling down a side of the mass pulls downwardly and laterally some of the material of the temporarily unfilled container portion opposite the base and thereby fails to add outward thrust sufficient to rupture the container.

18. Apparatus for use in ensiling freshly chopped feedstuff plant material in an elongated capsule of substantially air-impervious construction and having a thin, flexible, tubular sidewall with an end defining a front-end opening, said apparatus comprising:

ground-contacting, mobile support means having
- front and rear ends,
- a spaced pair of rear wheels mounted on the rear end, and
- at least one front wheel steerably mounted on the front end;

a rigid, elongated, tubular receiver having
- front and rear ends,
- a substantially flat bottom wall extending the length of the receiver and having a smooth upper surface, front and rear edges, and lateral borders,
- a pair of opposed sidewalls each having top borders, smooth inner surfaces, and front and rear edges and inclined upwardly and inwardly from a respective lateral border of and at an angle to the bottom wall approximating the angle of repose of the chopped plant material, the sidewall rear edges joining the bottom wall rear edge and sloping forwardly therefrom at a slope relative to the bottom wall always less than the angle of repose of the chopped plant portions, the sidewall forward edges joining the bottom wall forward edge and extending rearwardly therefrom at an angle approximating the angle of repose of the chopped plant portions,
- a top wall connecting the sidewalls, the top wall having a forward edge joining the sidewall forward edges and cooperating with the latter and the bottom wall forward edge to form a rim defining a receiver front opening, the top wall having a rear edge joining the sidewall rear edges and cooperating with the latter and the bottom wall rear edge to form a rim defining a receiver rear opening positioned inboard of the rear wheels, the top wall having a smooth inner surface, and a door adapted for closing the receiver rear opening and having a smooth inner surface and an upper edge;

means mounting the receiver, in the vicinity of its rear end, on the support means for pivoting thereon about a transverse pivot axis located near the rear wheels;

means mounting the door for pivoting relative to the receiver between a first position in which its inner surface closes the receiver rear opening and a second position in which it extends downwardly and rearwardly from the receiver and has its upper edge on the ground;

means for locking the door in its first position;

power-driven means for pivoting the receiver between an unloading position in which, with the door in its second position, the receiver bottom wall and the door inner surfaces form a substantially continuous, sloping surface extending from the interior of the receiver to the ground, and for raising the receiver front end to place the receiver in a second, loading position in which the slope of the bottom wall is increased;

means for rigidly affixing the capsule front end opening in coincidence with the receiver front opening when the capsule is placed in the receiver to permit deposition of the chopped plant material in the capsule; and means for injecting a liquid into the capsule in the receiver while a desired quantity of the chopped plant material is being deposited in the capsule.

19. The method of harvesting and ensilaging feedstuff plant material comprising:

moving over ground bearing feedstuff plant material to be converted into silage a machine which places itself in supporting relation to the feedstuff plant material to be converted into silage, chops it, and expels it;

receiving the expelled plant material directly from the machine into a closeable container of substantially air-impervious construction until the container is filled to a desired extent;

transferring the container to the ground while supporting the container until substantially all the container is supported by the ground; and fermenting the plant material in the container while substantially preventing the entry of air into the container.

20. The method of claim 19, further comprising the step antecedent to the steps of claim 19 and consisting of moving over said ground bearing the feedstuff plant material a machine which cuts the feedstuff plant material from plants growing on the ground and leaves the material lying on the ground.

21. The method of claim 19, further comprising severing the feedstuff plant material from plants growing on the ground, the severing being accomplished by the machine which places itself in supporting relation to, chops, and expels the feedstuff plant material.

22. The method of claim 19, further comprising the steps of:

moving the container in coordination with the machine to receive directly therefrom the expelled plant material; and placing the container on the ground, for fermentation of the feedstuff plant material therein, in the location where the container becomes filled to a desired extent.

23. The method of ensilaging feedstuff plants comprising:

supporting a capsule made of a thin, gas-impervious material and moving it over ground bearing a standing growth of feedstuff plants;

severing desired portions from the plants and depositing the severed portions in the moving capsule to form therein an elongated mass having a configuration with sides and ends lying at respective angles no greater than the angle of repose of the deposited material;

placing the capsule on the ground while substantially maintaining the configuration of the mass of feedstuff material therein; and fermenting the feedstuff material in the capsule while preventing the entry of air into the capsule.

24. The ensilaging method comprising:

supporting a flat, elongated, substantially air-impervious sheet and moving the same relative to ground-borne feedstuff plant material;

moving in coordination with the sheet a machine which cuts into pieces at least some of the plant material and deposits them on the sheet to form a mass having a configuration with sides and ends disposed at respective angles to the flat sheet at least as small as the angle of repose of the deposited pieces;

removing the sheet and the mass thereon to the ground while maintaining the configuration of the mass substantially undisturbed;

covering the sides, ends, and top of the mass with a substantially air-impervious material;

forming an air-impervious capsule surrounding the mass by effecting a seal between the material and sheet; and fermenting the plant material deposited in the capsule while preventing the entry of air into the capsule.

References Cited

UNITED STATES PATENTS

| | | | |
|---|---|---|---|
| 1,186,391 | 6/1916 | Gary | 302—17 X |
| 1,677,490 | 7/1928 | Raney et al. | 56—473.5 |
| 2,295,287 | 8/1942 | Muench | 206—83.5 |
| 2,593,577 | 5/1952 | Lewis | 99—4 |
| 2,712,797 | 7/1955 | Woehrle | 296—39 |
| 2,768,896 | 10/1956 | Lewis | 99—2 |
| 2,932,299 | 4/1960 | Brandt et al. | 130—20 |
| 3,214,221 | 11/1965 | Finnegan | 302—17 |
| 2,379,371 | 6/1945 | Moschel et al. | 55—18 |
| 2,749,695 | 6/1956 | Hoopingarner | 56—1 X |
| 3,132,459 | 5/1964 | Grillot | 56—341 |
| 3,162,003 | 12/1964 | Schapansky | 56—19 |
| 3,222,853 | 12/1965 | Michael | 56—202 |
| 3,242,658 | 3/1966 | Morales | 56—22 |
| 3,333,574 | 8/1967 | Harris | 119—51 |

FOREIGN PATENTS

| | | |
|---|---|---|
| 468,940 | 7/1937 | Great Britain. |

ALDRICH F. MEDBERY, *Primary Examiner.*

U.S. Cl. X.R.

56—22, 131, 341, 473.5; 130—20; 119—51; 150—2; 206—83.5

UNITED STATES PATENT OFFICE

CERTIFICATE OF CORRECTION

Patent No. 3,427,790 February 18, 1969

William J. Flittie

It is certified that error appears in the above identified patent and that said Letters Patent are hereby corrected as shown below:

In the heading to the printed specification, line 3, after "assignor" insert -- of ten percent --.

Signed and sealed this 12th day of August 1969.

(SEAL)
Attest:

Edward M. Fletcher, Jr.
Attesting Officer

WILLIAM E. SCHUYLER, JR.
Commissioner of Patents